United States Patent
Wallace et al.

(10) Patent No.: US 9,626,702 B2
(45) Date of Patent: Apr. 18, 2017

(54) METHOD AND APPARATUS FOR PROVIDING EMBEDDED TRANSACTION MODULES

(75) Inventors: Eugene Wallace, High Point, NC (US); Ashfaq Rahman, Bellevue, WA (US)

(73) Assignee: Market America, Inc., Greensboro, NC (US)

( * ) Notice: Subject to any disclaimer, the term of this patent is extended or adjusted under 35 U.S.C. 154(b) by 472 days.

(21) Appl. No.: 13/552,277

(22) Filed: Jul. 18, 2012

(65) Prior Publication Data

US 2013/0198032 A1    Aug. 1, 2013

Related U.S. Application Data

(60) Provisional application No. 61/591,484, filed on Jan. 27, 2012.

(51) Int. Cl.
*G06Q 30/00* (2012.01)
*G06Q 30/06* (2012.01)

(52) U.S. Cl.
CPC .............................. *G06Q 30/0601* (2013.01)

(58) Field of Classification Search
CPC ........................................ G06Q 30/00–30/08
USPC ................................................ 705/26.1–27.2
See application file for complete search history.

(56) References Cited

U.S. PATENT DOCUMENTS

| | | | |
|---|---|---|---|
| 2006/0095835 A1* | 5/2006 | Kennedy et al. | 715/513 |
| 2010/0114739 A1* | 5/2010 | Johnston | 705/27 |
| 2012/0011057 A1* | 1/2012 | Raman et al. | 705/38 |
| 2012/0233555 A1* | 9/2012 | Psistakis et al. | 715/751 |
| 2013/0117152 A1* | 5/2013 | Mebed et al. | 705/26.9 |

OTHER PUBLICATIONS

8th Bridge, Graphite, web page at http://www.8thbridge.com, as available via the Internet and printed Oct. 18, 2012.
8th Bridge, About 8th Bridge, web page at http://www.8thbridge.com/aboutpage, as available via the Internet and printed Oct. 18, 2012.
8th Bridge, In the News, web page at http://www.8thbridge.com/press-news, as available via the Internet and printed Oct. 18, 2012.
8th Bridge, Graphite 2 Product Launch Event, web page at http://www.8thbridge.com/graphite-2-launch, as available via the Internet and printed Oct. 18, 2012.
8th Bridge, Rewards, web page at http://www.8thbridge.com/graphite-platform/#rewards, as available via the Internet and printed Oct. 18, 2012.
8th Bridge, Social; Commerce IQ: Fashion, web page at http://www.8thbridge.com/socialcommerceiq, as available via the Internet and printed Oct. 18, 2012.
8th Bridge, Unleashed! Graphite Product Launch Event, web page at http://www.8thbridge.com/graphitelaunch, as available via the Internet and printed Oct. 18, 2012.

* cited by examiner

*Primary Examiner* — Michael Misiaszek
(74) *Attorney, Agent, or Firm* — Womble Carlyle Sandridge & Rice LLP; Jeffrey R. McFadden, Esq.

(57) ABSTRACT

Method and apparatus for provided embedded transaction modules are disclosed. One disclosed method comprises receiving a user input in an embedded transaction module displayed on a first webpage, wherein the user input is associated with a transaction and the embedded transaction module is not affiliated with the first webpage, and completing the transaction within the first webpage.

31 Claims, 29 Drawing Sheets

METHOD AND APPARATUS FOR PROVIDING EMBEDDED TRANSACTION MODULES

CROSS-REFERENCE TO RELATED APPLICATIONS

Pursuant to 35 U.S.C. §119(e) the present application claims the benefit of the filing date of U.S. Provisional Patent Application No. 61/591,484, filed Jan. 27, 2012, the entirety of which is hereby incorporated by reference.

FIELD OF THE INVENTION

The present invention generally relates to methods and apparatus for completing transactions and more particularly to methods and apparatus for providing an embedded transaction module in a first webpage not affiliated with the embedded transaction module, and completing transactions within the embedded transaction module without navigating away from the first webpage.

BACKGROUND

As the pervasiveness of the Internet has grown, sellers of goods and services predictably have attempted to reach consumers using the Internet and thereby increase their business. At a base level, brick and mortar retailers launched informational websites providing details about their businesses and/or products. Over time, e-commerce websites were launched and increasingly frequented by consumers who purchased goods or services through the websites. In an attempt to increase the traffic to their respective websites, many online retailers place advertisements such as banner advertisements and flash-based advertisements on other websites that potential customers may visit. For example, advertisements are often placed on news websites and on websites used to access free email accounts. The advertisements typically allow a user to click on the advertisement, or a link located therein, to proceed to the website of the advertising company.

Conventional Internet advertising suffers from several drawbacks. For example, Internet users may now have grown accustomed to and therefore may habitually ignore conventional forms of internet advertising such as banner ads and the like. Furthermore, even if a user who is accessing his email or reading a news article notices a banner ad or similar advertisement, he may decide to avoid the inconvenience of transitioning to a new web page by not clicking on the advertisement, even where he has some interest in the product or store described by the advertisement. To overcome these problems, it would be useful to provide a module in high traffic areas at the center of an Internet user's attention (e.g. in a Facebook user's news feed) that allows an Internet user to complete a transaction, such as a purchase, without navigating away from the webpage on which the user encountered the module (e.g. the Facebook user's news feed).

SUMMARY OF THE INVENTION

The present invention generally relates to a method comprising receiving a user input in an embedded transaction module displayed on a first webpage, wherein the user input is associated with a transaction and the embedded transaction module is not affiliated with the first webpage, and completing the transaction within the first webpage. Another embodiment comprises a computer-readable medium encoded with processor-executable program code for carrying out such a method.

These illustrative embodiments are mentioned not to limit or define the invention, but to provide examples to aid understanding thereof. Illustrative embodiments are discussed in the Detailed Description and further description of the invention is provided therein. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying figures, wherein.

DETAILED DESCRIPTION

Embodiments of the present invention provide systems and methods for embedded transaction modules.

Illustrative Embedded Transaction Module

In one illustrative embodiment, a user customizes a transaction module (e.g. select products to be displayed therein) and embeds the transaction module (hereinafter "embedded transaction module" or "ETM") in a social media webpage, such as Facebook, not affiliated with the ETM. The ETM is embedded in the user's Facebook "News Feed", as well as the News Feeds of the user's Facebook friends, as a result of the user posting the ETM to the user's "Wall" on his/her Facebook profile. Thereafter, Facebook friends of the user will see the ETM in their own News Feeds and on the poster's wall.

A user who subsequently views the ETM embedded in the Facebook page may click a "Browse Products" button to view products within the ETM. In response, the ETP presents the user with a display of products, including, for example, images, brief descriptions, and prices of the products. The list of products is provided within the ETM; the user never leaves the Facebook page. The user then interacts with the ETM to perform a number of operations that might otherwise be performed on a conventional, dedicated e-commerce website. For example, the user may click a button or link to view details of the product within the ETM.

From the resulting product detail view, the user may click a button to add the product to the user's shopping cart and then may click a button to view the contents of a shopping cart.

From the shopping cart, the user interacts with the ETM to complete steps typically associated with completing an online purchase. For example, a user may provide billing and shipping information by signing in to his/her account. The user may select a shipping preference and review the order before submitting it for processing. The user may then use the ETM to submit the order for processing.

In the illustrative embodiment, once the order has been processed, the ETM provides a confirmation screen. Throughout the foregoing process, the ETM of the illustrative embodiment displays products and operates to provide an interface for completing purchases of displayed products within a webpage not affiliated with the seller of the products displayed. Furthermore, the ETM allows a viewer to complete the purchase of the products on the webpage in which the transaction module is embedded, obviating the need to navigate to a second webpage.

Exemplary Device

Figure 1:
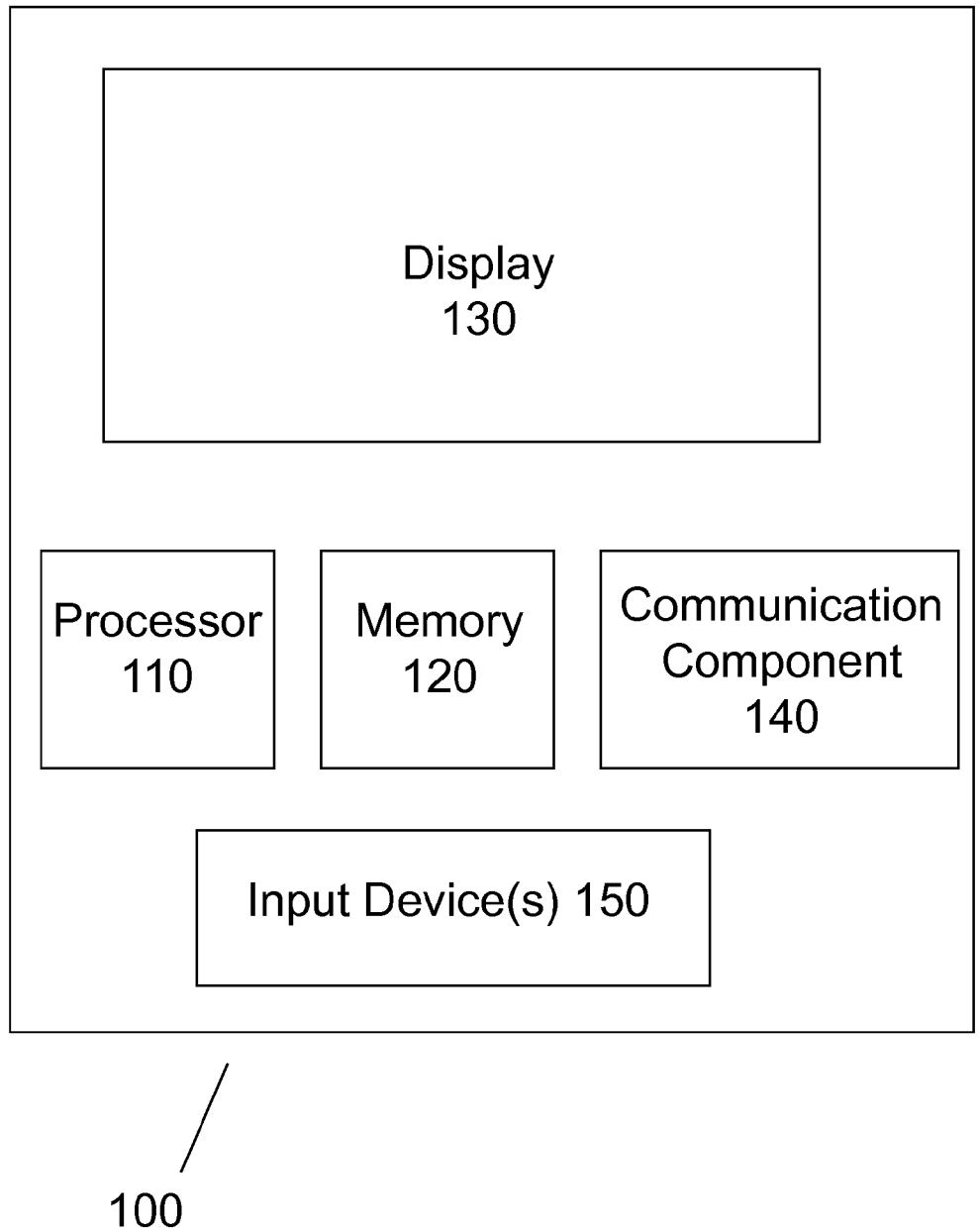
FIG. 1 is a block diagram illustrating a client device according to one embodiment of the present invention.

Referring now to FIG. 1, a block diagram illustrating a client device according to one embodiment of the present invention is shown. Client device 100 comprises a processor 110. Client device 100 also comprises a memory 120, a display 130, a communication component 140, and one or more input devices 150, all in communication with processor 110. Client device 100 may be any device capable of displaying and allowing interaction with Internet webpages. In one embodiment, client device 100 is a desktop computer. In other embodiments, client device 100 may be a laptop computer, a tablet computer (e.g. an iPad), a smart phone, or any other device capable of displaying and interfacing with webpages. Depending on the form of a client device 100, the display 130 may be a free-standing computer monitor connected to a computer via cable or it may be a display fixed within the housing of the client device 100 (e.g. a tablet computer or a smart phone). In some embodiments, the client device 100 may comprise a touch screen that acts as both a display 130 and an input device 150. In other embodiments, input devices 150 may include a keyboard, keypad, touchpad, scroll wheel, mouse, voice recognition system, motion detection system, and/or any other computer input device known to one having ordinary skill in the art.

Client device 100 is able to communicate over a network using a communication component 140. In the embodiment shown, communication component 140 is an Ethernet card. However, in embodiments of the present invention, communication component 140 may be any component that allows communication with a network. For example, communication component 140 may be a wireless networking device, or a module and antenna for communication with a cellular network. Client device 100 also comprises memory 120 which stores software program code that is executable by processor 110. For example, memory 120 may comprise random-access memory that stores program code for an operating system and a web browser (hereinafter "client web browser") for allowing a user to view and interact with webpages. For example, memory 120 may comprise software program code for Microsoft Windows and Mozilla Firefox, Safari, Opera, Chrome, Internet Explorer, or any other web browser.

Figure 2:
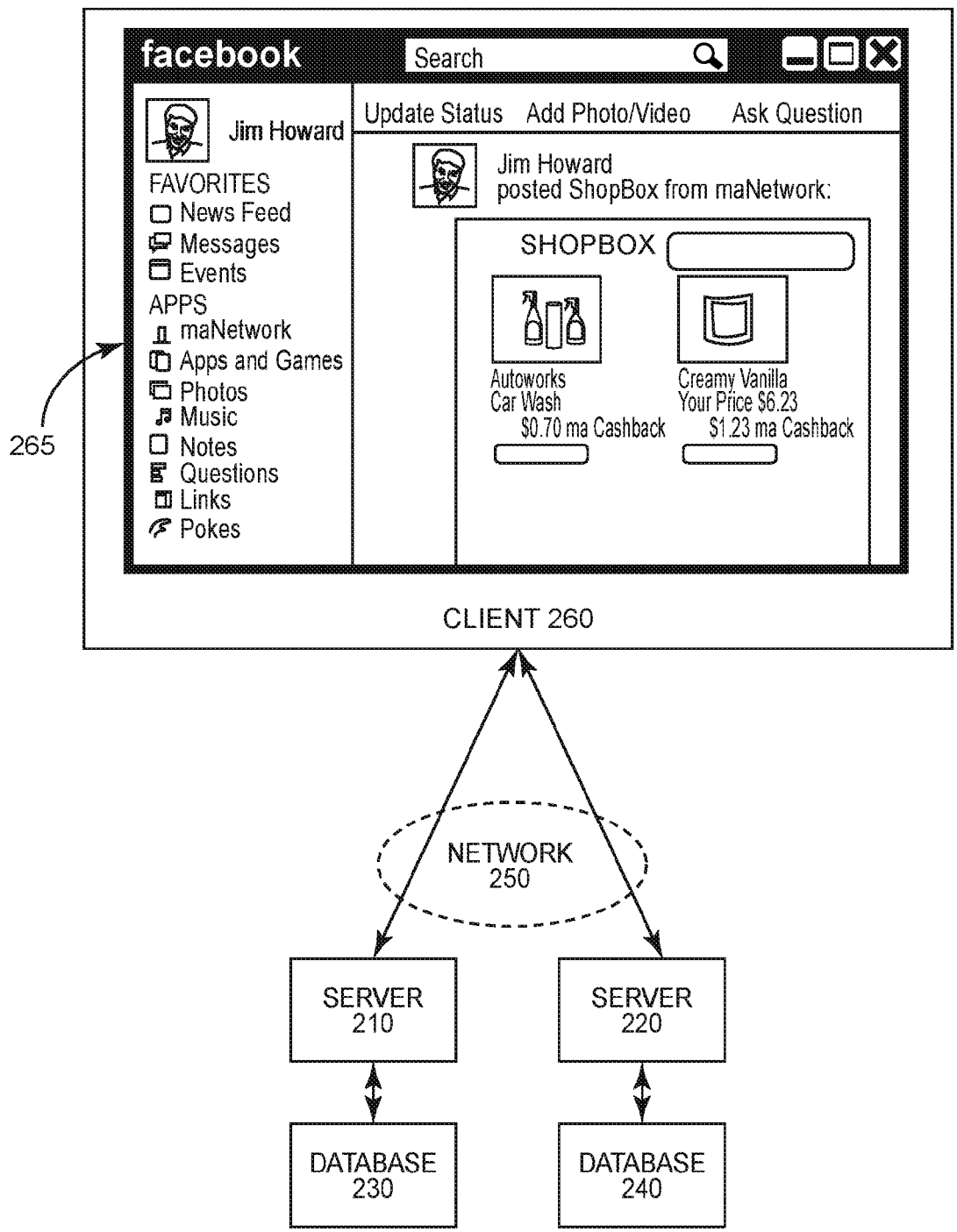
FIG. 2 is a block diagram illustrating a client-server network configuration according to one embodiment of the present invention.

As described above, the client device of embodiments of the present invention communicates over a network. FIG. 2 is a block diagram illustrating a client-server network configuration according to one embodiment of the present invention. A client device 260 communicates with servers over a network 250, such as the Internet, as shown in FIG. 2. Web servers 210 and 220 are operative to service requests from client devices, such as client device 260, for webpages, files, or other data. In one embodiment, server 210 and/or server 220 comprise a secure web service layer which services requests from client device 260. In one embodiment, servers 210 and 220 respectively interface with databases 230 and 240 to retrieve data needed to fulfill client requests. In another embodiment, servers 210 and 220 may locally store the information required to fulfill a client request. Each of these embodiments may further incorporate a secure web service layer in server 210 and/or server 220 to service requests from client device 260 for information stored at the external databases 230 and 240 or at databases local to the servers 210 and 220, thereby wrapping the database with the secure web services.

The servers 210 and 220 may each be affiliated with particular websites. For example, server 210 may be affiliated with Facebook. Then, when a user enters www.facebook.com into the address line of a client web browser running on the client device 260, the client device 260 communicates with web server 210. In response to the request from client device 260, server 210 may provide a predefined webpage or client object, or may provide a webpage or client object constructed on the fly. For example, the server 210 may utilize Java Server Pages, Active Server Pages, PHP, and/or some other dynamic web generation facility to query database 230 for data, and use the data to construct a webpage or a client object. The generated webpage/client object may comprise or reference a JavaScript such as a jQuery script or a Flash object. Once the server 210 has constructed the webpage/client object, the server 210 can then transmit the webpage/client object to the client device 260.

Upon receiving a requested webpage/client object, client device 260 may display the webpage/client object on display 265. The webpage/client object may contain references directing the client web browser executing on client device 260 to communicate over the network 250 with a second server, such as server 220, to request an object (e.g. an ETM). In one embodiment, the second server 220 that provides an ETM is not affiliated with the first server 210, the webpage provided by server 210, or the website to which the webpage belongs. A server, such as server 220, of such an embodiment is sometimes referred to herein as an "ETM Server." To fulfill the request of the client web browser, the server 220 may query database 240 for the requested object and then communicate the requested object to the client web browser.

Operation of an Illustrative ETM

Figure 3:
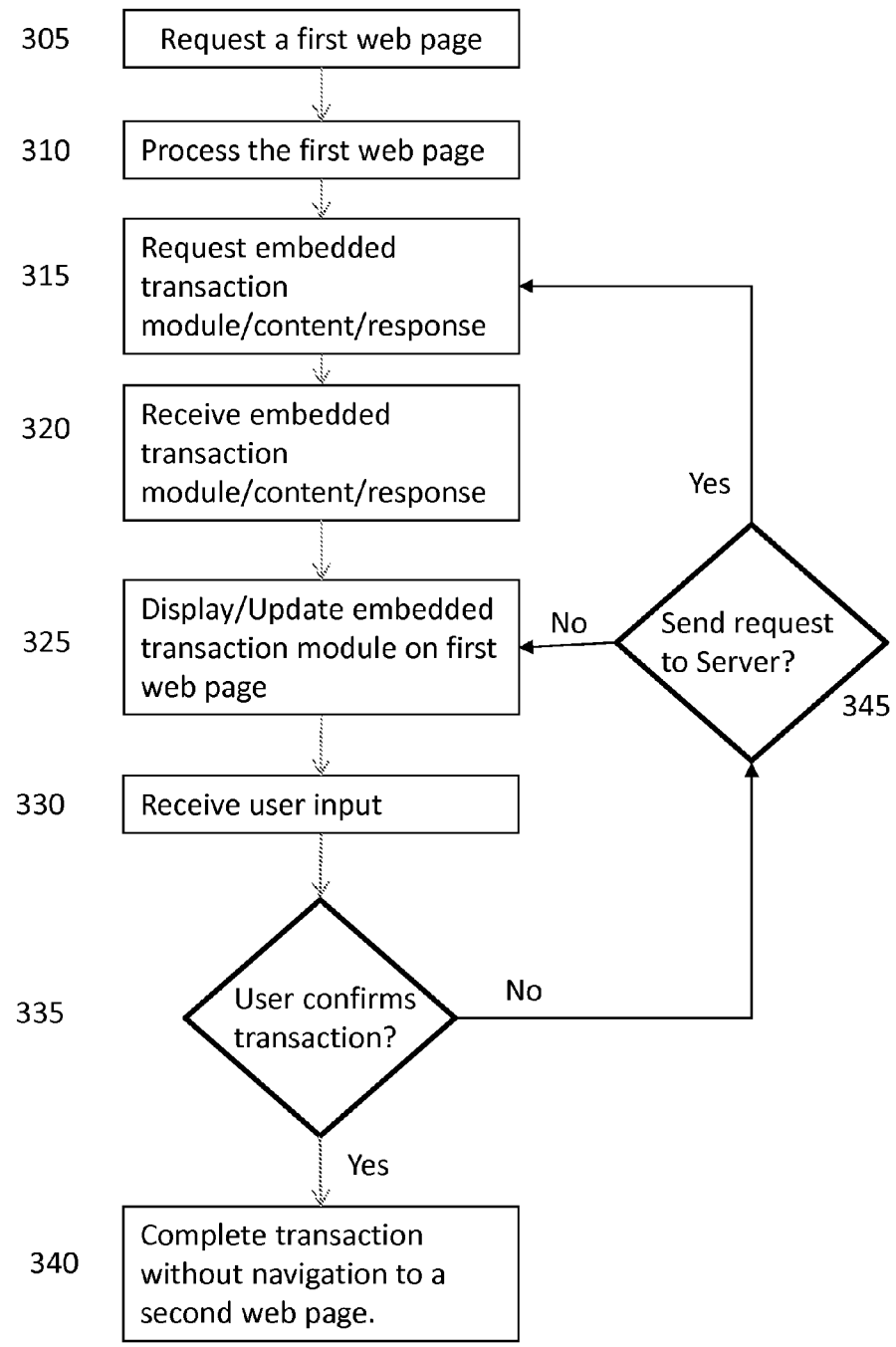
FIG. 3 is a flow diagram illustrating the operation of an embedded transaction module according to one embodiment of the present invention.

FIG. 3 is a flow diagram illustrating the operation of an ETM according to one embodiment of the present invention. In particular, FIG. 3 shows steps performed by a client device to execute a transaction in an ETM embedded in an unaffiliated webpage according to one embodiment of the present invention. To aid in understanding how each of the steps may be performed, the following description is provided in the context of the illustrative system shown in FIG. 2. However, embodiments of the present invention may be implemented in alternative embodiments. At step 305, the client device 260 requests a first webpage from a first web server 210 affiliated with a website. Typically the client device 260 will request the webpage based on input from a user of the client device 260. For example, a user may enter a URL into the address field of a web browser or may click a saved bookmark for a specific webpage. The webpage may be a social media webpage constituting part of a social media website such as Facebook, Twitter, Myspace, or any social media website. In other embodiments, the webpage may constitute part of a blog, a fan page, or any other type of website.

At step 310, the client device 260 receives and processes the requested webpage received from the first web server 210. The ETM of the present invention may be embedded in the requested webpage in a number of different ways. For example, in one embodiment the ETM is implemented using Adobe Flash and embedded in an unaffiliated webpage by using an HTML <object> tag and by specifying a URL identifying an ETM Server 220 as the location of the ETM.

At step 315, the client web browser executing on the client device requests the ETM from an ETM Server 220. For example, the web browser may submit an HTTP request to the server. In another embodiment, the web browser may submit an FTP request to the server. In still another embodiment, the web browser may use HTTPS to submit a secure request.

At step 320, the client web browser receives the ETM. As described above, an ETM may be implemented as a Flash object. In another embodiment an ETM is implemented as an applet and is also embedded in a webpage by using the HTML <object> tag and requested/received in the manner described above.

In some embodiments, an ETM is implemented using JavaScript or any other scripting language commonly used in web applications. In one embodiment, the jQuery JavaScript library is used to implement an ETM. An ETM implemented using a scripting language may be embedded in the webpage by using an HTML <script> tag and by specifying a URL identifying an ETM Server 220 as the location of the script implementing an ETM not affiliated with requested webpage. At step 315, the client web browser of the client device requests the script implementing the ETM from the ETM Server 220 and, at step 320, receives the script.

In another embodiment, an ETM may be implemented as a Flash object, as an applet, or as a script, and may be embedded in a requested webpage in the following manner. First, the requested web page references a script (e.g. using the HTML <script> tag) located on a web server 210, the server affiliated with the requested web page. Next, a client web browser executing on a client device requests and receives the script from the web server 210. The client web browser displays the requested webpage and executes the script thereby causing an image and/or text representing the ETM to be displayed on the web page. Upon detecting that a user clicked on the image or text representing the ETM, the script determines that a request is to be sent to an ETM Server 220 for the ETM implemented as a Flash object, an applet or a script. The script then sends the request to the ETM Server 220. Next, the ETM is received by the client web browser executing on the client device (the equivalent of step 320 in the embodiment described above).

In other embodiments, the ETM and functionality related thereto may be implemented through the use of one or more of the technologies mentioned above and other known technologies that one having ordinary skill in the art would consider for implementing interactive functionality within a webpage, including HTML components, and databases, such as MYSQL, SQLServer, and/or IBM DB2 or Universe Databases.

Having received the ETM at step 320, or an equivalent step in an alternate embodiment, in each of the scenarios described above, the client web browser executing on a client device displays the web page, if it has not previously done so, and executes the Flash object, applet, or script implementing the ETM, thereby causing the module to be displayed on the webpage. An illustrative embodiment of an ETM of the present invention is described below in relation to FIGS. 6 through 14B. At step 330, input is received by the ETM. At decision point 335, the ETM determines whether the user confirmed a transaction. If so, at step 340 the ETM communicates a request to the ETM Server 220 to complete the transaction, waits for confirmation that the transaction has been completed, and upon receiving said notification, provides a confirmation to the user that the transaction has been completed, all without navigating to a second webpage.

If the ETM determines, at decision point 335, that the received user input is not a confirmation of a transaction, the ETM determines whether a request should be communicated to the ETM Server 220 at step 345. For example, in some cases the ETM may have—residing in the memory of client device 260—all of the data required to update its display in response to a particular user interaction and therefore does not need to submit a request to the ETM Server 220. If no request is to be sent, at step 325 the ETM updates its display based on the received user input. If the ETM determines that a request is to be sent to the ETM Server 220, at step 315 the ETM sends a request to the server. At step 320, the ETM receives a response from the ETM Server 220. At step 325, the ETM updates its display based on the received user input and/or the response from the ETM Server 220.

In summary, the method illustrated in FIG. 3 displays an ETM, receives one or more user inputs, updates the display of the ETM, and completes a transaction without navigation from the first webpage. Updating the displayed contents of the ETM may involve communication with an ETM Server 220. For example, a user clicking a button to submit a registration request after entering registration information in provided fields may cause the ETM to submit the registration information to the ETM Server 220 and display a success or failure message based on a response from the ETM Server 220. In other embodiments, the ETM may communicate with one or more servers other than the ETM Server. In some cases, updating the displayed contents of the ETM does not involve communication with a server. For example, a user clicking on an image of a product may cause the ETM to display a zoom view of the product where the image used for the zoom view was present in the ETM at the time the module was loaded. The flow diagram described above in relation to FIG. 3 is applicable to the illustrative embodiments described below in relation to FIGS. 6 through 14B.

Figure 4:
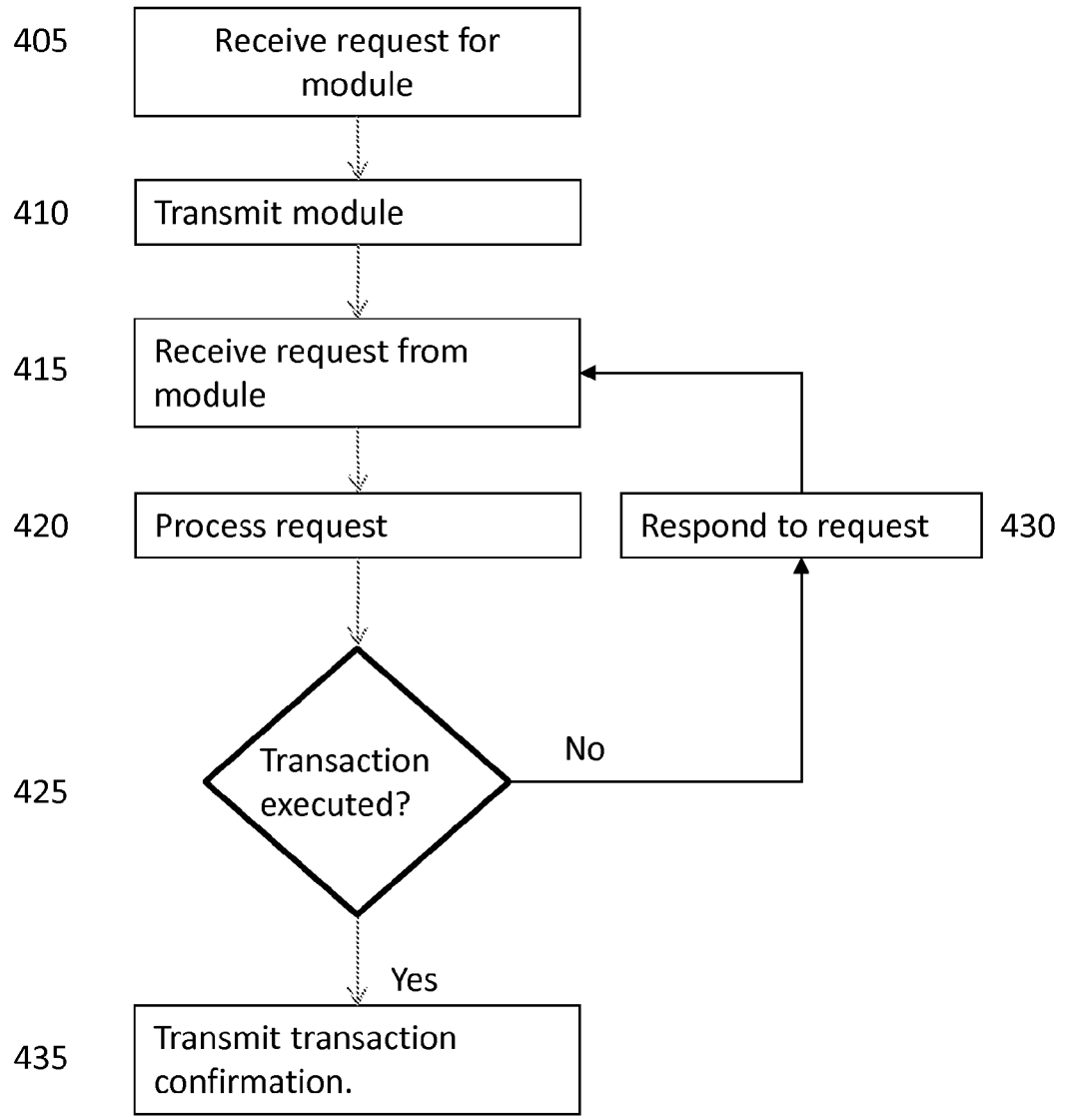
FIG. 4 is a flow diagram illustrating the operation of a server in communication with an embedded transaction module according to one embodiment of the present invention.

FIG. 4 is a flow diagram illustrating the operation of a server in communication with an ETM according to one embodiment of the present invention. In particular, FIG. 4 shows steps performed by an ETM Server 220 related to executing a transaction in an ETM embedded in an unaffiliated webpage according to one embodiment of the present invention.

At step 405, an ETM Server 220 receives a communication requesting an ETM from a client web browser executing on a client device. For example, the ETM server 220 may receive an HTTP request from the client web browser. In another embodiment, the ETM Server 220 may receive an FTP request from the client web browser. In still another embodiment, the ETM Server 220 may receive a secure request submitted using HTTPS.

At step 410, the ETM Server 220 sends the requested ETM to the client web browser. As described above, the ETM provided by the ETM Server 220 may be a Flash object, an applet, or a script. In one embodiment, at least two versions of an ETM are available, and the type or capabilities of the client device requesting the ETM are determined from the request received at step 405 and are used to select which version of the ETM is to be provided at step 410. For example, an ETM implemented using Flash may be provided in response to a request from a laptop computer, while a second version of the ETM implemented using jQuery may be provided in response to a request from an Apple iPad.

At step 415, the ETM Server 220 receives a request from an ETM on a client device. The request may be, for example, an account registration request containing registration information, a log in request containing log in information, an image request seeking an alternative view of a product, a transaction execution request, or any other request that may be implemented to support the ETM.

At decision point 425, the server determines if the request is a transaction execution request. If so, the ETM Server 220 processes the transaction and sends a transaction confirmation message to the ETM at step 435. If the request is any other type of request, the server prepares the appropriate response and sends the response to the ETM at step 430.

Creating and Customizing an ETM

Figure 5:
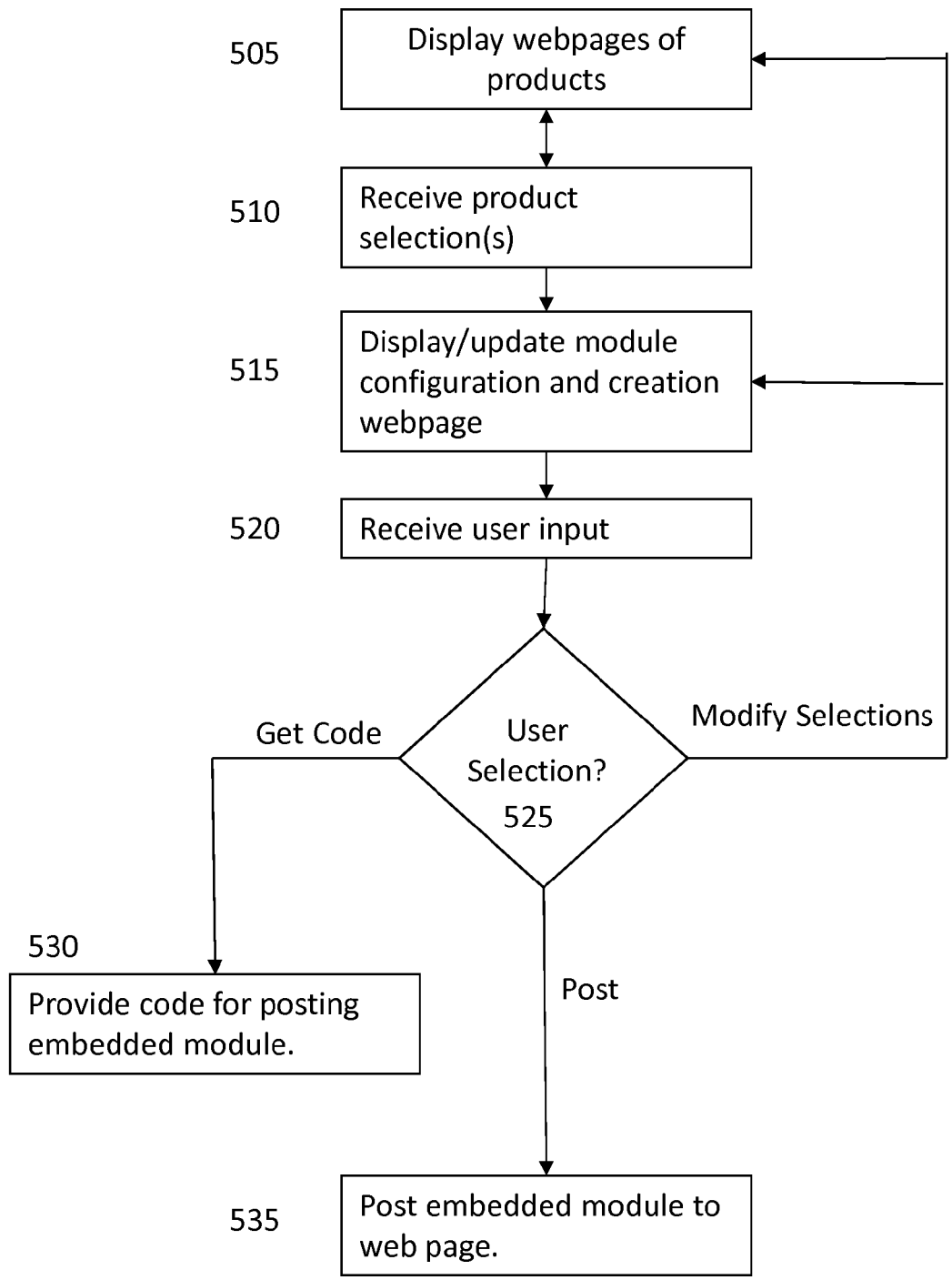
FIG. 5 is a flow diagram illustrating the operation of a web-based tool according to one embodiment of the present invention.

FIG. 5 is a flow diagram illustrating the operation of a web-based tool according to one embodiment of the present invention. In particular, FIG. 5 shows steps performed by a web-based tool for creating and customizing an ETM according to one embodiment of the present invention.

At step 505, the client device displays one or more webpages containing products. In one embodiment, a user navigates to different webpages containing products by clicking on various links provided on each webpage. The products may be displayed on the various webpages according to an organizational scheme. For example, the products may be organized by price, popularity, product type, or any other scheme.

At step 510, the web-based tool receives one or more user selections of products to be displayed by an ETM. After selecting one or more products on a particular webpage of products, a user may click a link to cause the web-based tool to display more products (returning to step 505), select an additional product to be displayed by the ETM (remaining at step 510), or may click a link to load a webpage for configuring and creating the ETM (proceeding to step 515).

At step 515, a webpage for configuring and creating the ETM is displayed or updated based on user input received at step 520. In one embodiment the configuration and creation webpage comprises images and user interface elements to allow a user to select an image, delete products from the ETM, return to viewing webpages of products, post the ETM to a webpage, or generate a code for posting the ETM on a webpage.

At step 520 a user input is received by the web-based tool. At decision point 525, the web-based tool determines the nature of the user input. If the user clicked a link to return to viewing webpages of products, one or more webpages containing products are displayed at step 505. If the user deleted a product from the ETM or selected an initial image to be displayed by the ETM, the content displayed on the webpage for configuring and creating the ETM is updated at step 515. If the user directed the web-based tool to post the ETM to a webpage, the web-based tool posts the ETM to a webpage, such as a Facebook user's wall, at step 535. In another embodiment, the web-based tool posts the ETM to a user's blog site. In another embodiment, the web-based tool posts the ETM to a user's Twitter page. If the user directs the web-based tool to provide a code for posting a module, at step 530 the web-based tool provides code for use by the user to post the ETM to a webpage. For example, the web-based tool may provide HTML code. In one embodiment, a user copies the provided code and pastes it into an HTML document that comprises part of a website. In another embodiment, a user may write program code to generate webpages containing the provided code.

Exemplary User Interface Embodiments

An exemplary interface for an ETM according to one embodiment of the present invention will now be described. However, any number of interface designs for displaying products and completing a transaction within an ETM embedded in a first webpage without navigation from the first webpage may be used. Furthermore, this exemplary embodiment shows the ETM within a Facebook user's "News Feed" on a Facebook webpage. However, as described above, the ETM of the present invention may be embedded in any number of webpages on websites not affiliated with the transaction module. In some embodiments, two or more ETMs may be embedded in a single webpage. For example, a webpage may include several different concepts, and each ETM may be customized to the particular concept with which it is associated. The webpage on which the ETM is embedded is otherwise a conventional webpage. Thus, a webpage having one or more ETMs embedded therein may be viewed on any of the devices described above. While the exemplary embodiments of ETM interface screens described herein are shown presenting text in English, in other embodiments ETMs may be configured to present text in any known language, including but not limited to, Spanish, Portuguese, French, German, Italian, Mandarin Chinese, Cantonese, and Thai.

Figure 6:
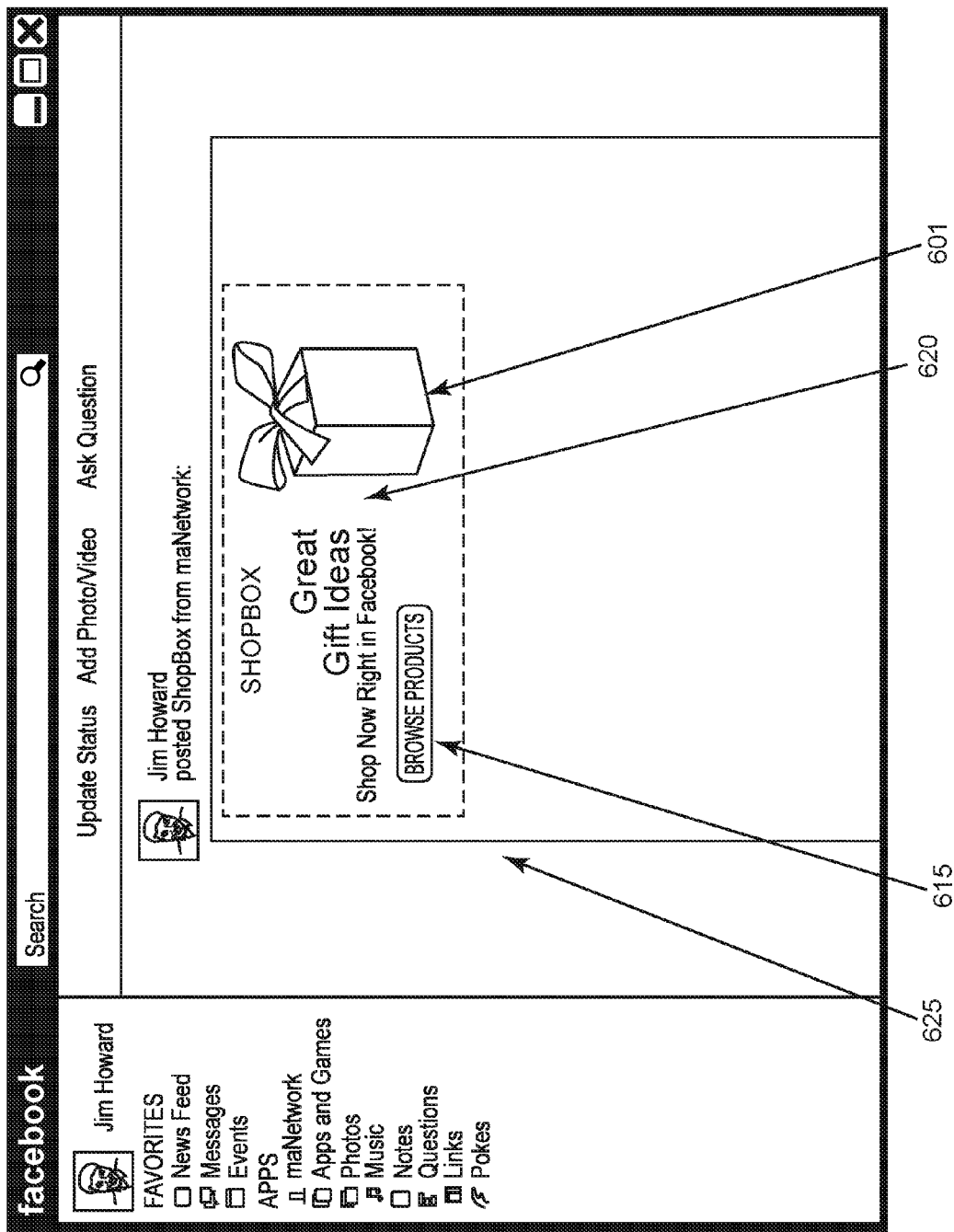
FIG. 6 is an exemplary initial user interface screen displayed by an embedded transaction module according to one embodiment of the present invention.
Figure 7:
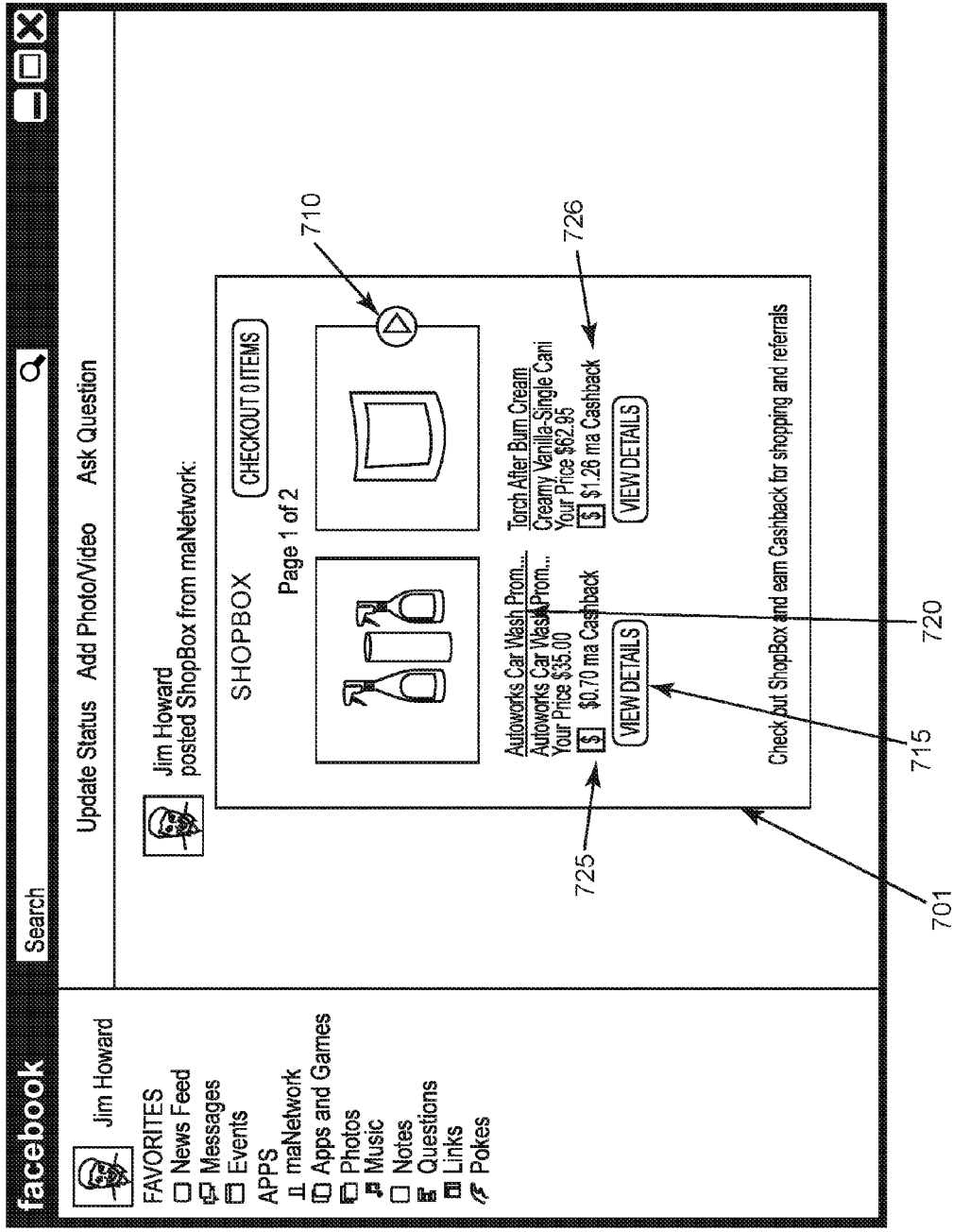
FIG. 7 is an exemplary user interface screen for displaying products in an embedded transaction module according to one embodiment of the present invention.

FIG. 6 is an exemplary initial user interface screen displayed by an ETM according to one embodiment of the present invention. In this exemplary embodiment, the ETM 601 initially displays an image 620 inviting user interaction and a button 615 for facilitating user interaction. Upon a user clicking the "Browse Products" button 615, the interface of the ETM 601 is updated to display products, related information and user interface components, as shown in FIG. 7. In another embodiment, the interface of FIG. 7 may be initially displayed by the ETM.

FIG. 7 is an exemplary user interface screen for displaying products in an ETM according to one embodiment of the present invention. The interface includes images of products 725, 726 and basic product information (name, price, etc.). The presence of button 710 indicates that there are additional products to view. Pressing button 710 will update the ETM 701 to display an additional product or products. Furthermore, a user may press button 715 to view details of a product, as shown in FIG. 8A.

Figure 8A:
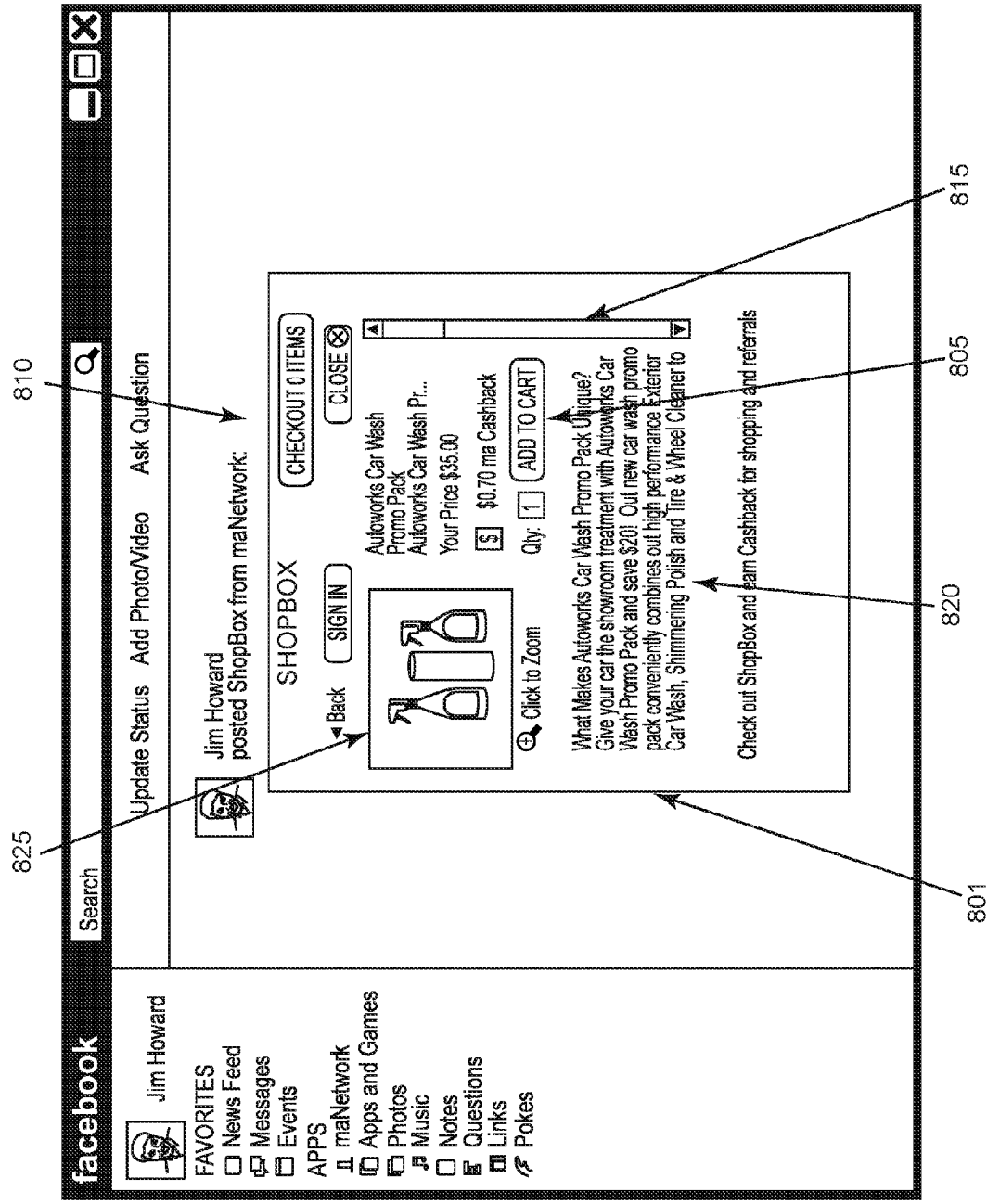
FIG. 8A is an exemplary user interface screen for displaying product information in an embedded transaction module according to one embodiment of the present invention.
Figure 8B:
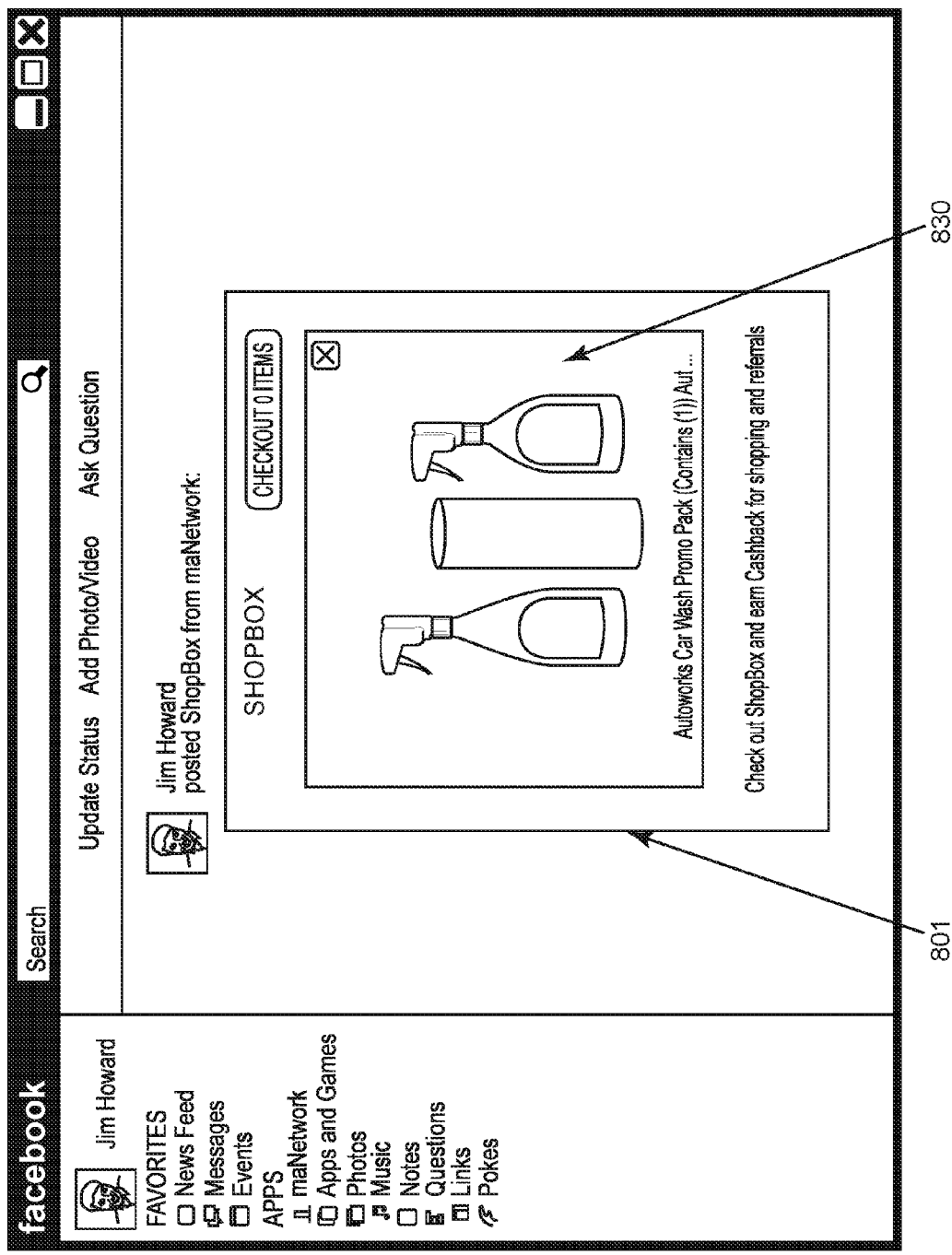
FIG. 8B is an exemplary user interface screen for providing a product view in an embedded transaction module according to one embodiment of the present invention.
Figure 8C:
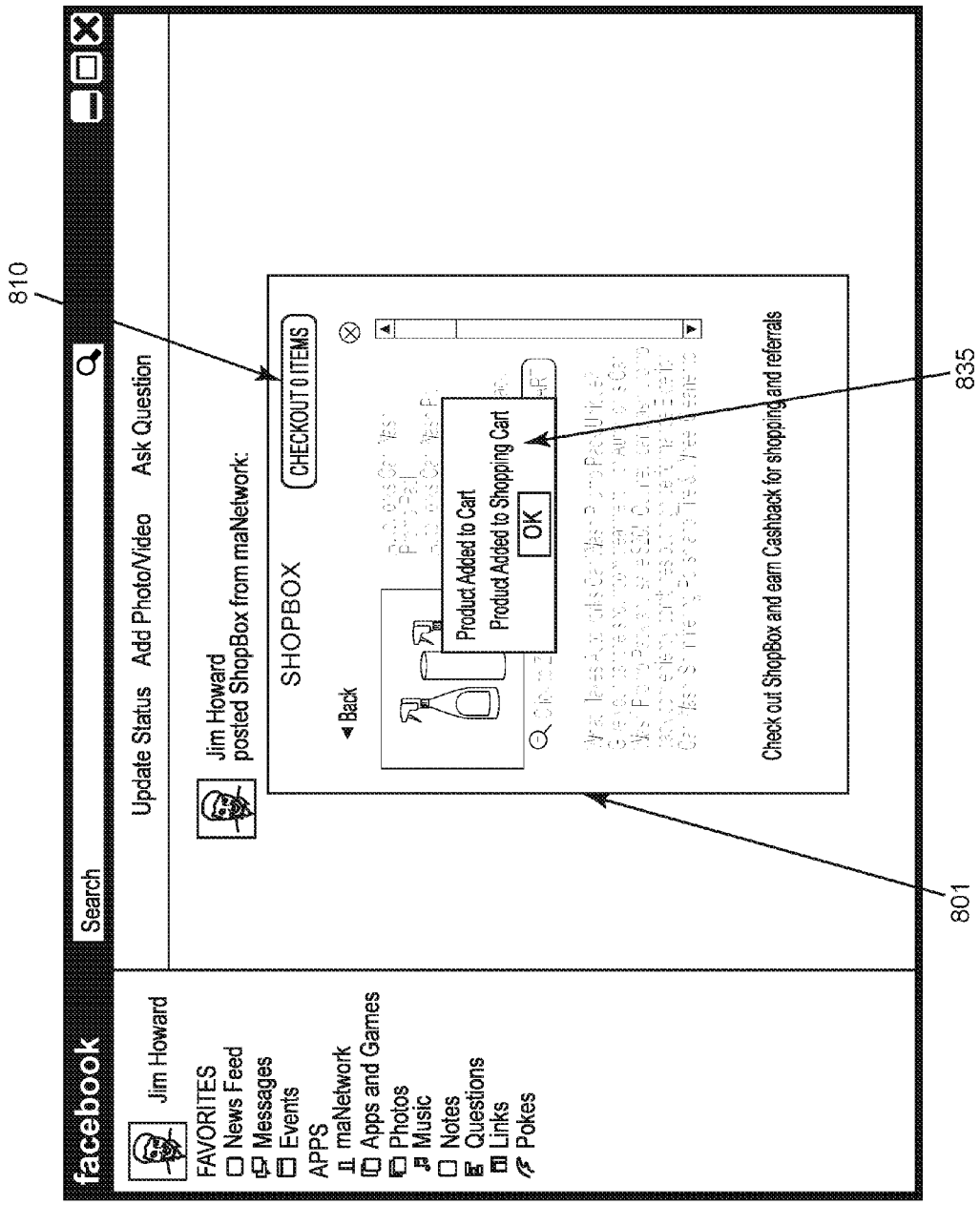
FIG. 8C is an exemplary user interface screen illustrating a confirmation notice displayed by an embedded transaction module according to one embodiment of the present invention.

FIG. 8A is an exemplary user interface screen for displaying product information in an ETM according to one embodiment of the present invention, FIG. 8B is an exemplary user interface screen for providing a product view in an ETM according to one embodiment of the present invention, and FIG. 8C is an exemplary user interface screen illustrating a confirmation notice displayed by an embedded transaction module according to one embodiment of the present invention. Text 820 provides a detailed description of the product. Where the product detail information exceeds the display area of the ETM 801, a scroll bar 815 is provided to allow scrolling to view additional information. A user may click on product image 825 to view an image 830 (as shown in FIG. 8B) that is a larger version of the image 825. Should the user decide to purchase the product, the user may click the button 805 to add the product to the user's shopping cart. In response to a user click of button 805, the ETM provides a confirmation notice 835 and updates the item count displayed on button 810, as shown in FIG. 8C. In another embodiment, the item count displayed on button 810 is updated, but no confirmation notice is displayed. When the ETM detects the clicking of button 810, the module will display the user's shopping cart, as shown in FIG. 9.

Figure 9:
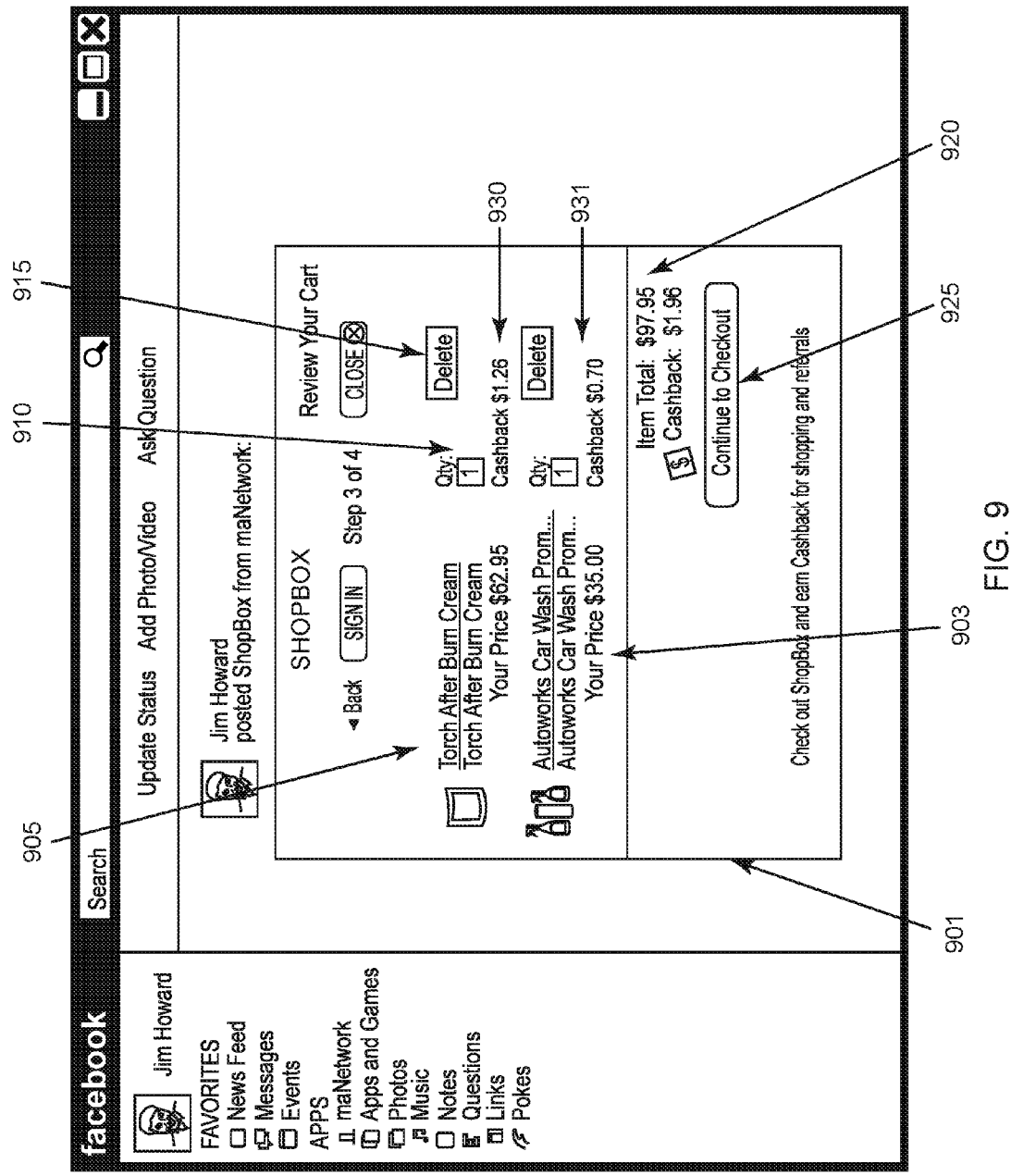
FIG. 9 is an exemplary user interface screen illustrating a shopping cart of an embedded transaction module according to one embodiment of the present invention.

FIG. 9 is an exemplary user interface screen illustrating a shopping cart of an ETM according to one embodiment of the present invention. The shopping cart 903 displayed by the ETM 901 in FIG. 9 comprises elements which might be present in a shopping cart on a conventional e-commerce website. In particular, the shopping cart includes product information (images and textual descriptions) 905, editable quantity fields 910 indicating the quantity of each product in the shopping cart, buttons 915 to delete items from the shopping cart, a total price 920 for the products in the shopping cart, and a button 925 for initiating checkout. Upon detecting that a quantity field 910 has been edited or that a delete button 915 has been clicked, the ETM 901 updates the displayed information to reflect the changes. Upon detecting that the button 925 has been clicked, the ETM transitions to one of two screens depending on whether a user is "signed in" or "logged in" to the ETM 901. If a user is not "logged in" to ETM 901 when the "Continue to Checkout" button 925 is clicked, the ETM 901 transitions to a screen providing an interface for logging in or for choosing to create an account, as illustrated in FIG. 10A.

Figure 10A:
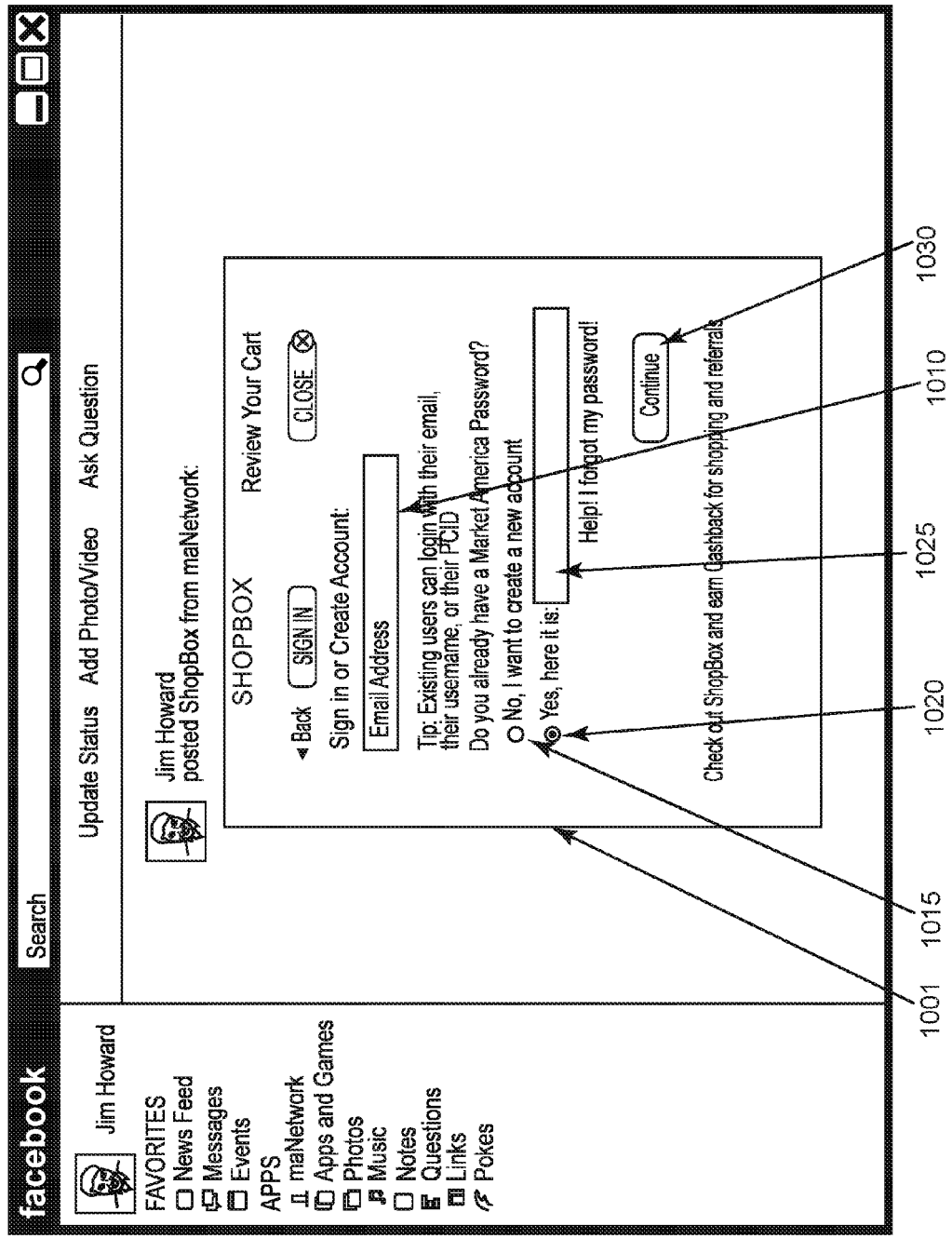
FIG. 10A is an exemplary user interface screen for logging in or creating an account in an embedded transaction module according to one embodiment of the present invention.
Figure 10B:
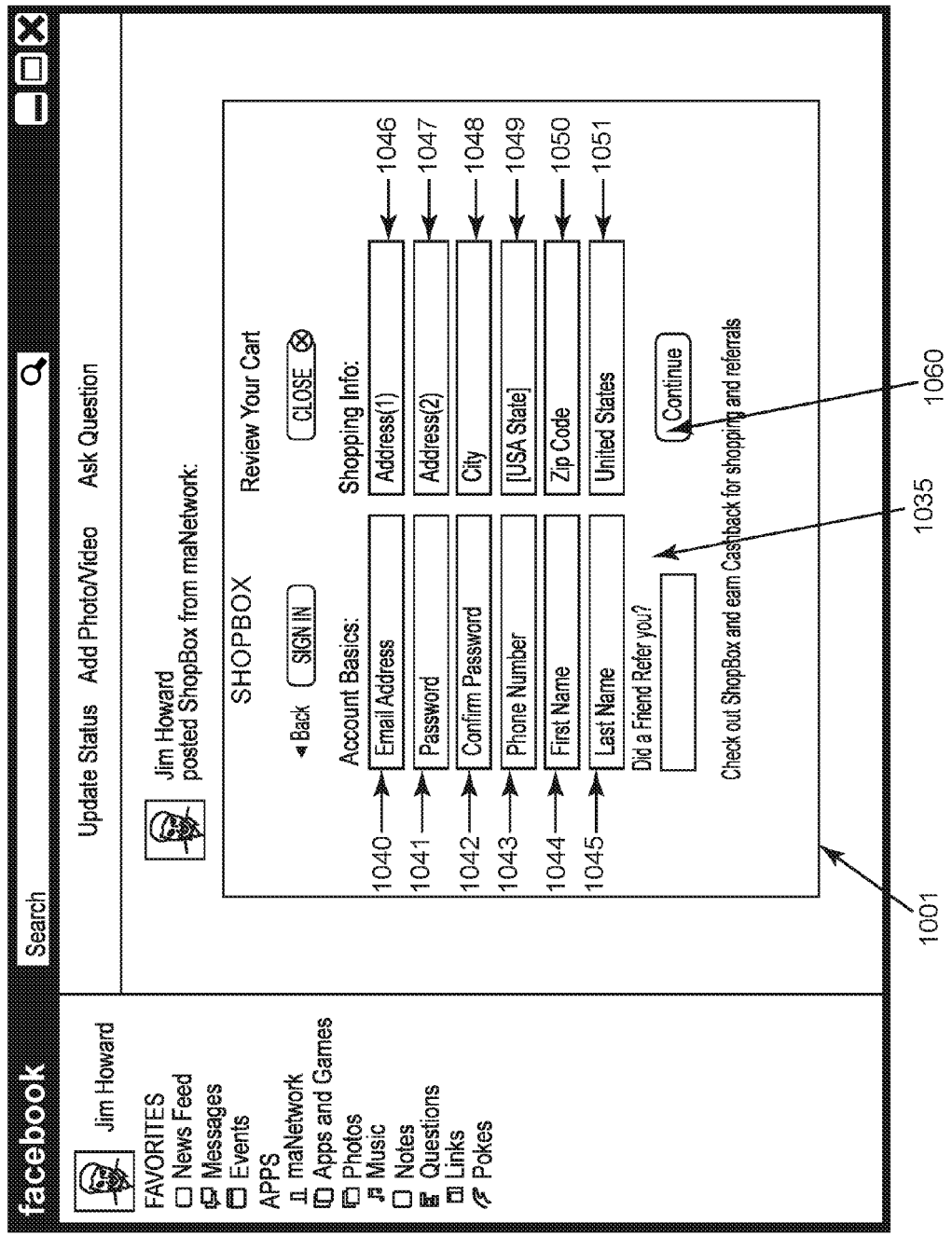
FIG. 10B is an exemplary user interface screen illustrating a form for creating an account in an embedded transaction module according to one embodiment of the present invention.

FIG. 10A is an exemplary user interface screen for logging in or creating an account displayed in an ETM according to one embodiment of the present invention. In the embodiment shown in FIG. 10A, an editable field 1010 prompts a user to enter his/her email address. In other embodiments, logging in to ETM 1001 and/or creating an account for use with the ETM 1001 may based on a unique user id, an account number, or any other method known by those having ordinary skill in the art. Radio button 1015 may be selected to indicate that a new account is to be created. Conversely, radio button 1020 may be selected to indicate that the user intends to log in. In the event of the latter, the user is prompted to enter a password associated with the user's account into editable field 1025. A "Continue" button 1030 is provided to allow a user to signal that the user is finished entering information and making selections. If radio button 1015 is selected when the ETM 1001 detects that the "Continue" button 1030 is clicked, the ETM 1001 displays an account information form 1035, as shown in FIG. 10B and described below. On the other hand, if radio button 1020 is selected when the ETM 1001 detects that the "Continue" button 1030 is clicked, the log in credentials provided by a user in fields 1010 and 1025 are verified.

In one embodiment, the ETM 1001 may communicate with an ETM Server 220 to request a password associated with an email address (or other means for uniquely identifying a user discussed above) entered in field 1010. Upon receiving the requested password, the ETM 1001 compares the password entered in field 1025 with the password provided by the ETM Server 220 to determine if the provided log in information is valid. In another embodiment, the embedded transaction may communicate both the user identification information entered in field 1010 and the password entered in field 1025 to the ETM Server 220 for verification by comparison to account information stored on the ETM Server 220 or on a database server 240 in communication with the ETM Server 220. Upon successfully verifying the information, the ETM Server 220 communicates with the ETM 1001 to notify it that the user provided valid credentials. Once the ETM 1001 determines that a user has successfully logged in, by performing the password comparison itself or by receiving notification from the ETM Server 220, the ETM 1001 may notify the user that the log in attempt was successful. For example, a confirmation notice may be displayed.

Figure 10C:
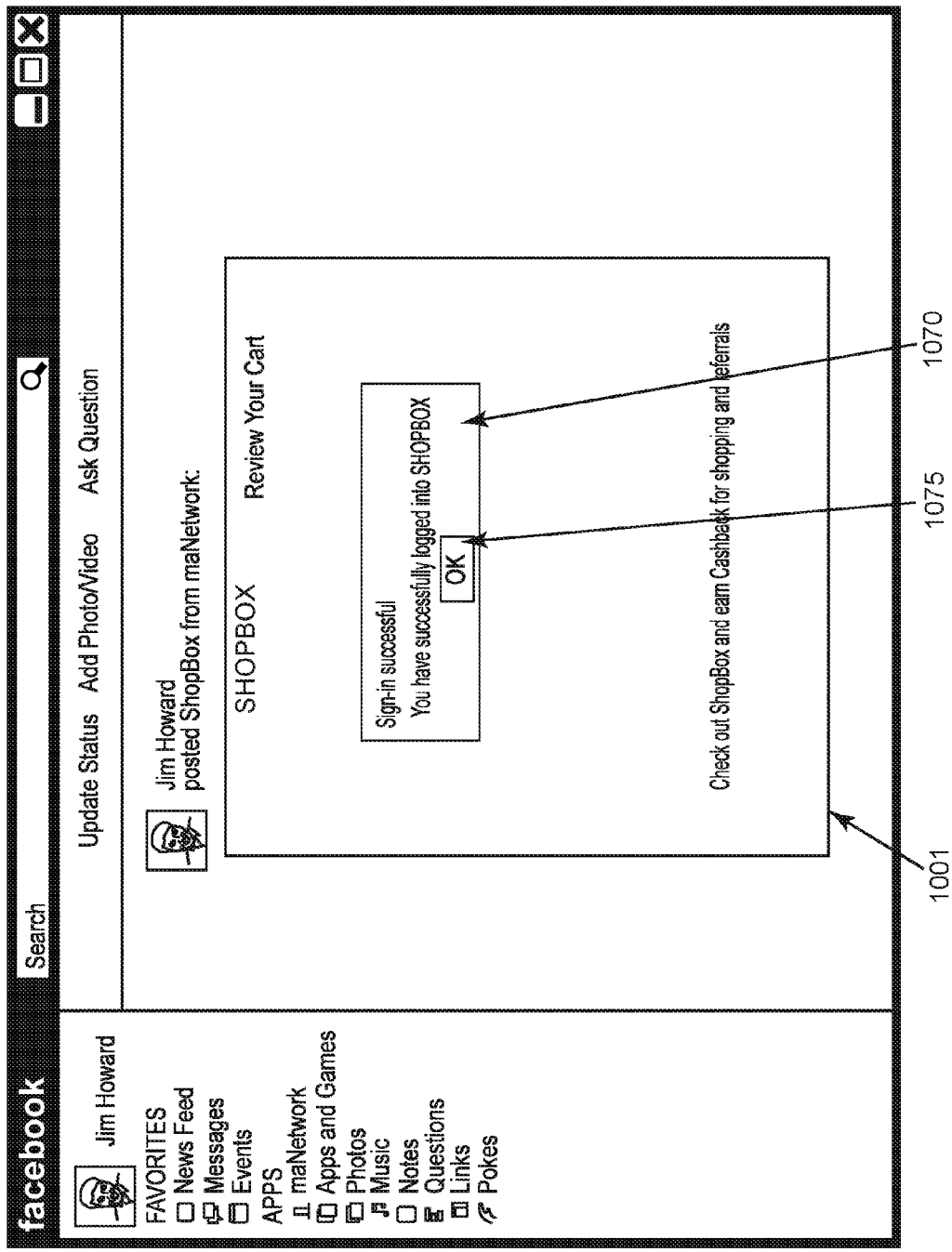
FIG. 10C is an exemplary user interface screen illustrating a successful log in confirmation notice displayed by an embedded transaction module according to one embodiment of the present invention.

FIG. 10C is an exemplary user interface screen illustrating the display of a successful log-in confirmation notice in an ETM according to one embodiment of the present invention. As illustrated in FIG. 10C, the ETM 1001 displays a notification window 1070 containing a text notification. In the illustrated embodiment, the notification window 1070 contains a button 1075 for dismissing the notification window 1070. In another embodiment, the ETM 1001 may display the notification window 1070 for a period of time. In still further embodiments, the ETM 1001 may not display a notification at all. Rather, the ETM 1001 may transition to a subsequent screen, thereby indicating that the log in attempt was successful.

FIG. 10B is an exemplary user interface screen illustrating a form for creating an account displayed in an ETM according to one embodiment of the present invention. FIG. 10B comprises editable fields 1040-1048 and 1050 and drop-down selection boxes 1049, 1051 for entry of information for creating an account. "Continue" button 1060 is provided by the ETM 1001 for submitting account information entered into the form and completing the account creation process. As is common in the art, information entered into fields 1040-1051 may be checked for erroneous information. For example, upon detecting that the "Continue" button 1060 is clicked, the information entered may be checked by the ETM 1001. Alternatively, the entered information may be transmitted to the ETM Server 220 and then checked for errors by one or more processes executing on the ETM Server 220. The ETM Server 220 may then provide a confirmation or an error notice to the ETM 1001. If the ETM 1001 detects an error or is notified of an error by the ETM Server 220, it may operate to notify the user of the error and prompt the user to correct the faulty information.

Figure 11A:
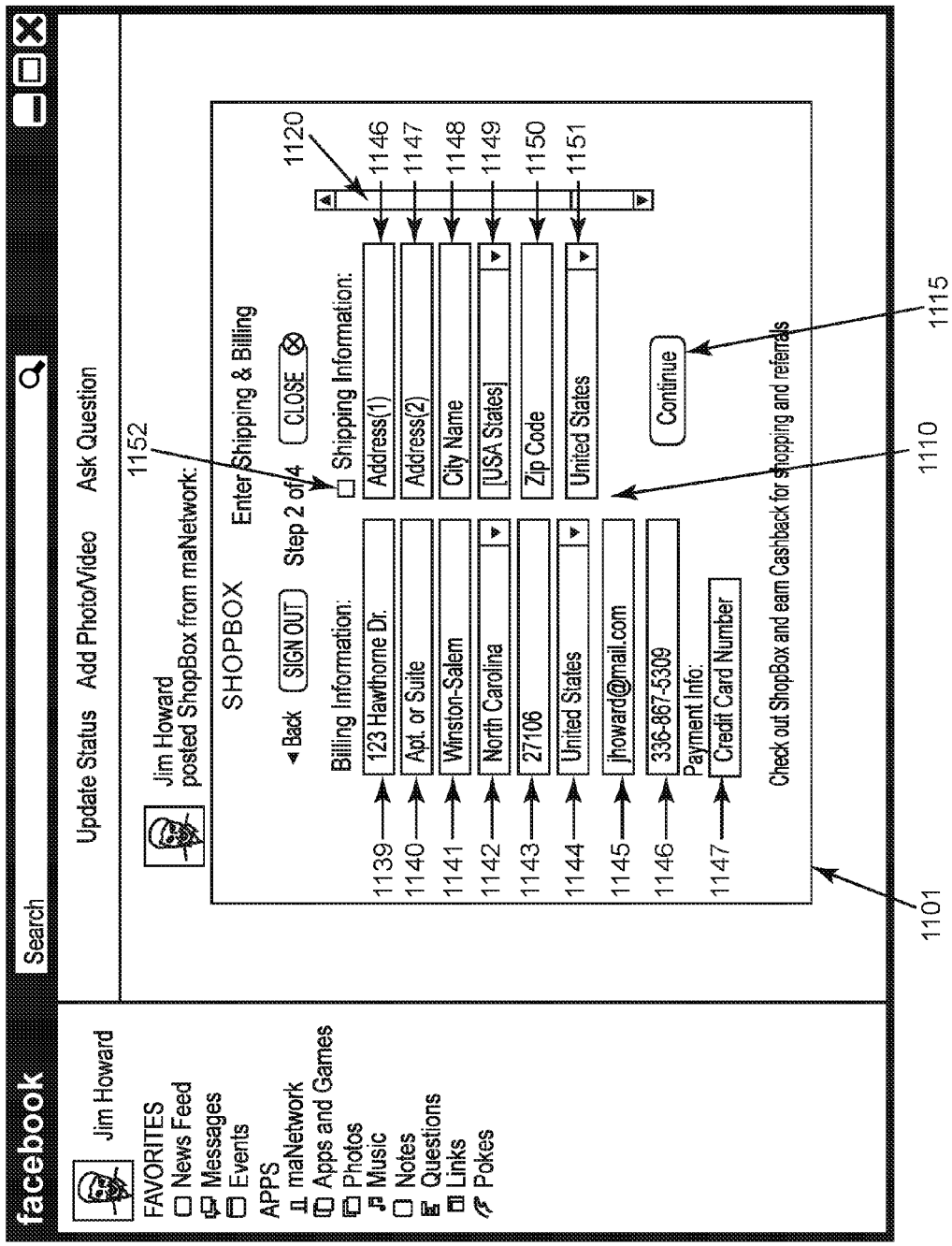
FIG. 11A is an exemplary user interface screen illustrating a form for entering shipping and billing information in an embedded transaction module according to one embodiment of the present invention.
Figure 11B:
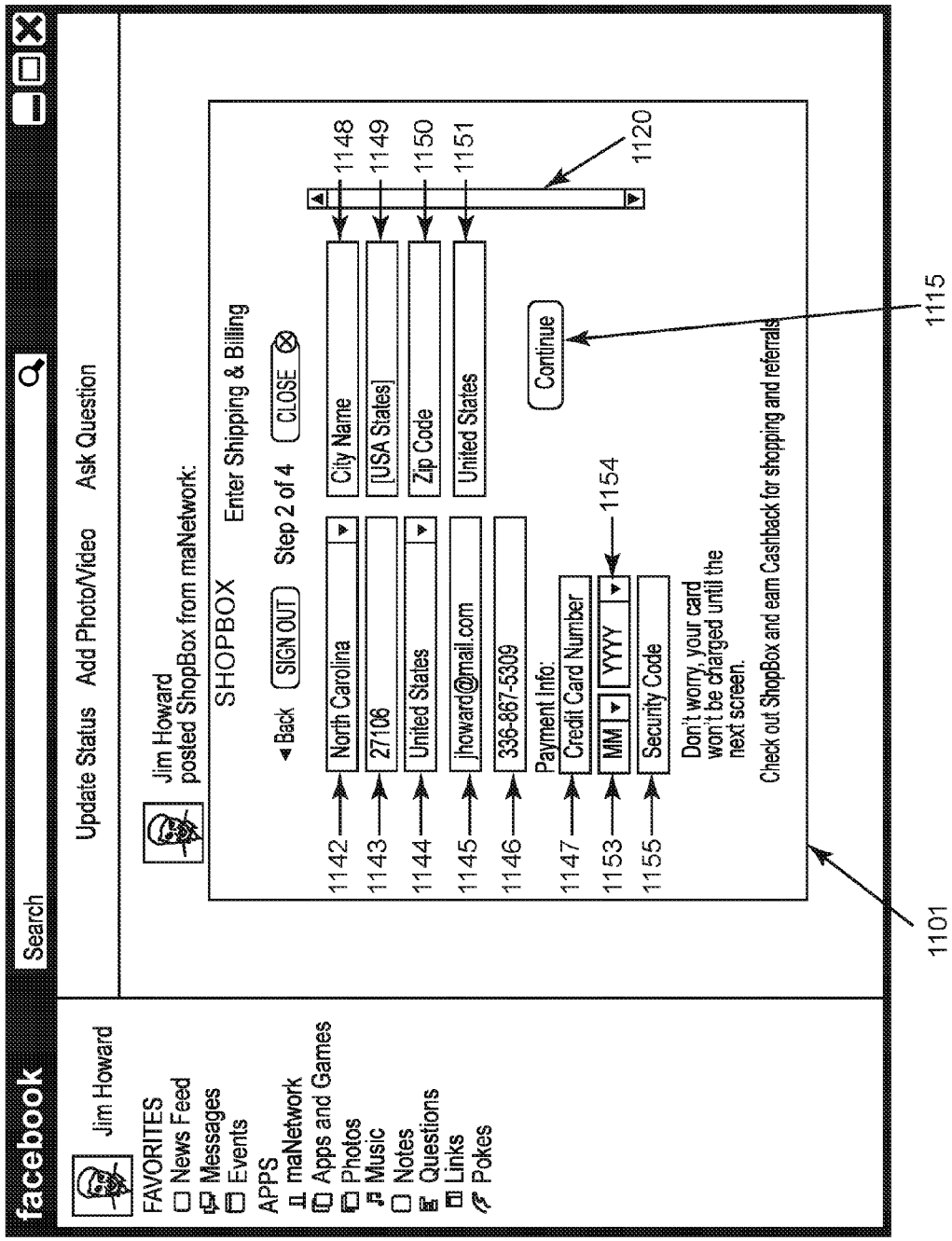
FIG. 11B is an exemplary user interface screen illustrating a form for entering shipping and billing information in an embedded transaction module according to one embodiment of the present invention.

FIGS. 11A and 11B are an exemplary user interface screens illustrating a form for entering shipping and billing information in an ETM according to one embodiment of the present invention. In the embodiment illustrated by FIGS. 11A and 11B, the form 1110 is not completely viewable at one time in ETM 1101. Accordingly, a scroll bar 1120 is provided to scroll the form 1110 up or down to see additional portions of the form 1110. FIG. 11A provides a view of form 1110 with the scroll bar 1120 at its top-most position. FIG. 11B provides a view of form 1110 with the scroll bar 1120 at its bottom-most position. Some portions of form 1110 are shown in both FIGS. 11A and 11B.

In one embodiment, the form 1110 illustrated by FIGS. 11A and 11B may be displayed following the notification that a user has successfully logged in, such as the notification window 1070 of FIG. 10C. In another embodiment, the form 1110 may be displayed immediately after a user provides valid login information in fields 1010, 1025 and clicks the "Continue" button 1030 of FIG. 10A. In still another embodiment, the form 1110 may be displayed by the ETM 1101 immediately after a user provides new account information in fields 1040-1048, 1050 and drop down selection boxes 1049, 1051, and presses the "Continue" button 1060 of FIG. 10B. Moreover, if the user is already logged in to the ETM 1101 prior to clicking the "Continue to Checkout" button 925 of FIG. 9, then the ETM 1101 may directly transition to form 1110 upon detecting that "Continue to Checkout" button 925 has been clicked.

Figure 13A:
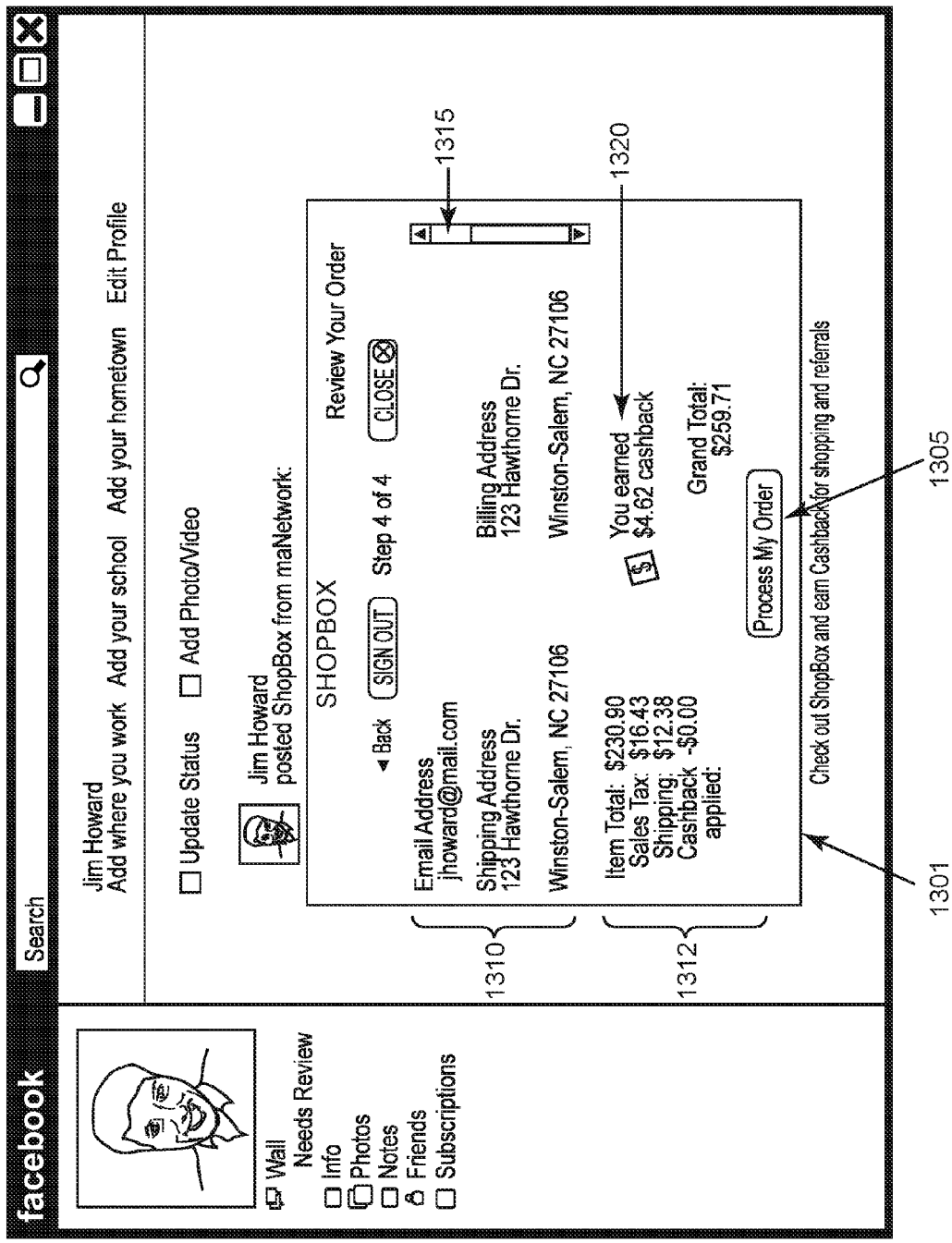
FIG. 13A is an exemplary user interface screen for reviewing an order in an embedded transaction module according to one embodiment of the present invention.
Figure 13B:
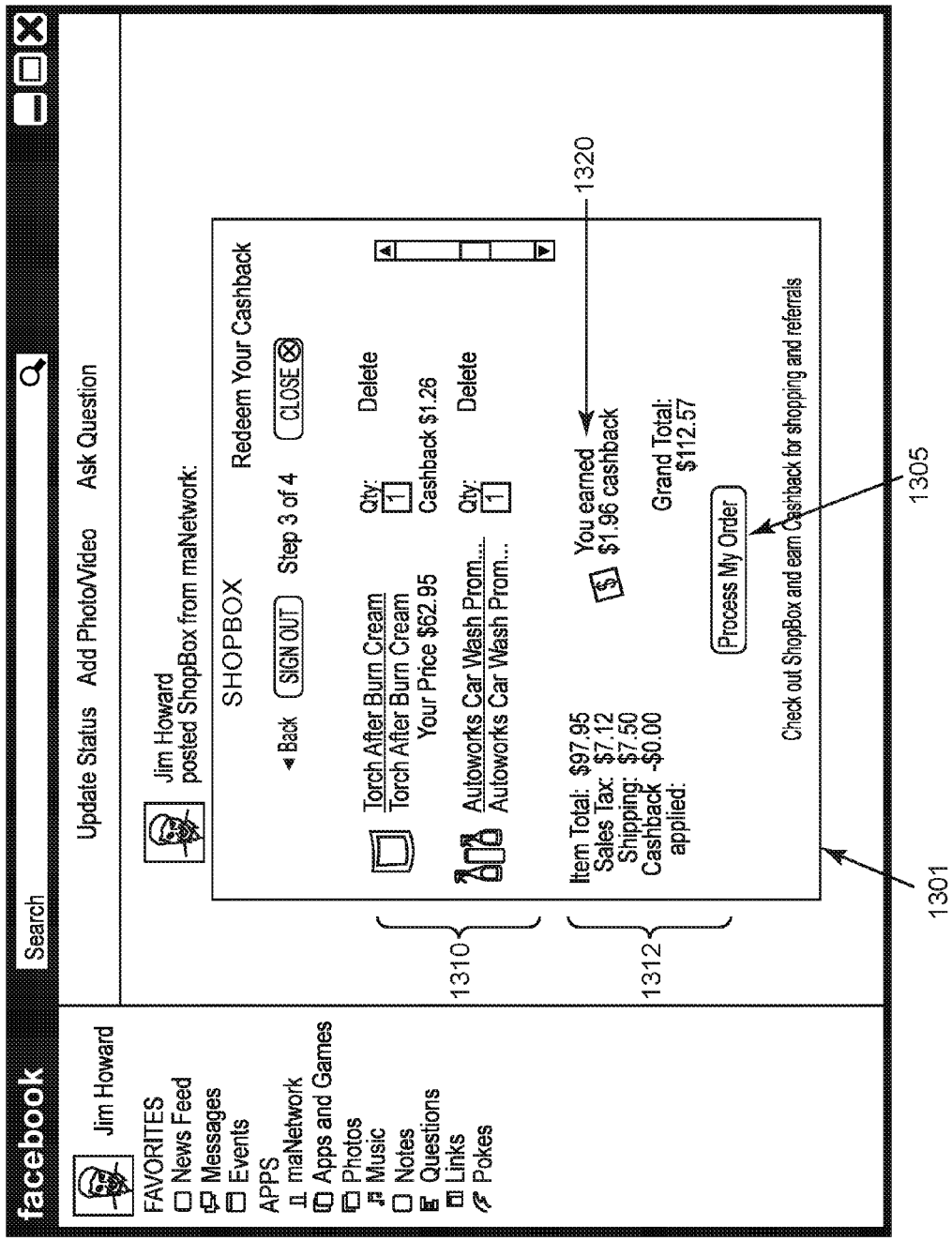
FIG. 13B is an exemplary user interface screen for reviewing an order in an embedded transaction module according to one embodiment of the present invention.
Figure 13C:
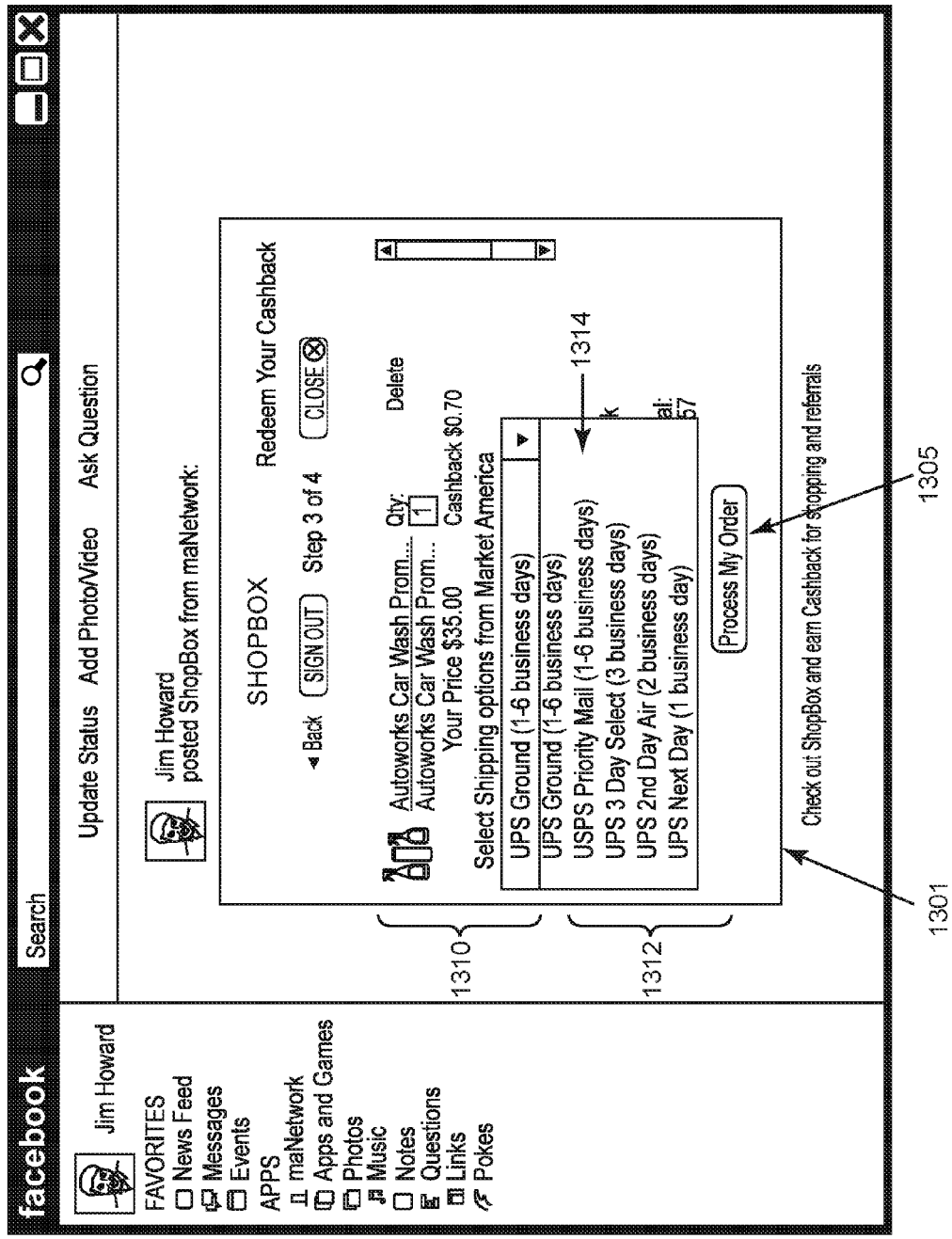
FIG. 13C is an exemplary user interface screen for reviewing an order in an embedded transaction module according to one embodiment of the present invention.

Form 1110 comprises editable fields (1139-1141, 1143, 1145-1148, 1150, and 1155), drop down selection boxes (1142, 1144, 1149, 1151, and 1153-1154), and a check box (1152). The ETM 1101 provides a "Continue" button 1115 for a user to click once the user has finished entering his/her shipping and billing information. While FIGS. 11A and 11B show fields for entering credit card information, in other embodiments the ETM may provide fields appropriate for accepting any number of other forms of payment including electronic funds transfers from checking or savings accounts and PayPal payments. As described above in relation to FIG. 10B, some or all of the entered information may be checked for erroneous entries by processes executing on the client machine, executing on a web server, or a combination thereof. For example, the ETM may check that information was entered in all required fields and may check the validity of an entered zip code and state combination by referencing a local database. Alternatively, all of the information provided in the form is communicated to an ETM Server 220 that performs the error checking Finally, the ETM 1101 may check to ensure that information has been provided for all required fields in the form 1110 and then communicate the information provided in the form to an ETM Server 220. Upon receiving the information from the form, the ETM Server 220 may perform additional error checks, such as the verification of the zip code and state entries, and communicate the whether the entry was valid/invalid to the ETM 1101. In one embodiment, once the form 1110 is successfully submitted, the ETM 1101 may display the order review screen illustrated in FIGS. 13A, 13B and 13C. FIGS. 13A, 13B and 13C are exemplary user interface screens illustrating an order review screen displayed in an ETM according to one embodiment of the present invention. In this embodiment, a bottom portion 1312 of the order review screen displays the monetary totals for the transaction. A top portion 1310 provides additional information and functionality related to the transaction. Not all of the additional information and functionality of top portion 1310 is viewable at one time. Accordingly, top portion 1310 comprises a scroll bar 1315 for scrolling the top portion 1310 up and down. As shown in FIG. 13A, the top portion 1310 of the order review screen is operative to display transaction information such as the email, shipping, and billing addresses associated with the transaction. In addition, the top portion 1310 of the order review screen is operative to display the products, and quantities and prices thereof, as shown in FIG. 13B. As shown in FIG. 13C, the top portion 1310 of the order confirmation screen further comprises a drop-down selection list for selecting shipping options. In other embodiments, an ETM may display a separate screen for selecting shipping preferences or provide the functionality in combination with one or more of the previously described screens.

The order review screen of the ETM 1301 includes a button 1305 for submitting the transaction for processing. Upon detecting that button 1305 has been clicked, the ETM communicates the order information to an ETM Server 220 for processing and displays the order processing screen of FIG. 14A.

Figure 14A:
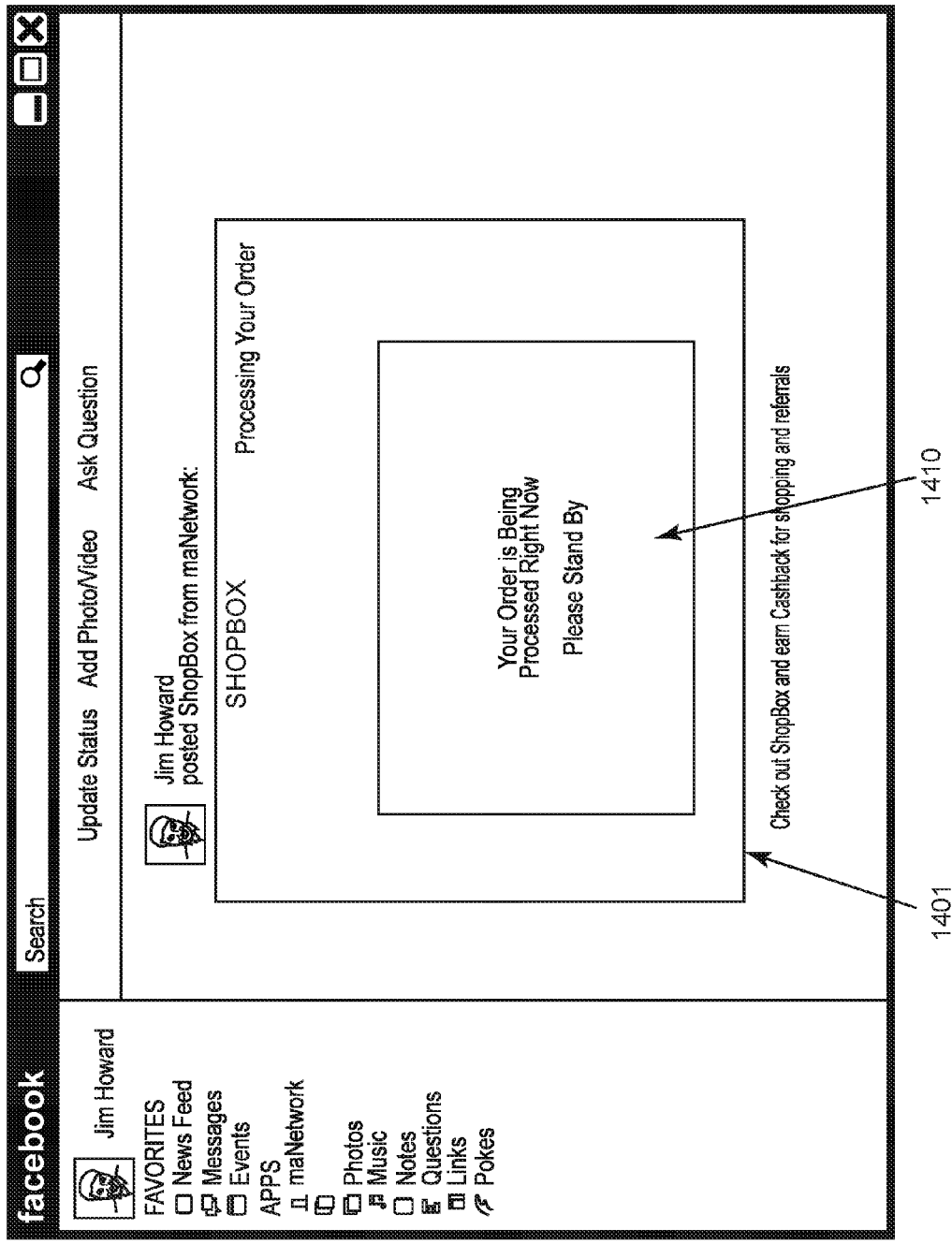
FIG. 14A is an exemplary user interface screen illustrating an order processing screen displayed by an embedded transaction module according to one embodiment of the present invention.

FIG. 14A is an exemplary user interface screen illustrating an order processing screen displayed by an ETM according to one embodiment of the present invention. In one embodiment, the order processing screen 1410 is displayed by ETM 1401 until a response is received from the ETM Server. Once the ETM 1401 receives a response from the server that the order has been processed, an order confirmation screen may be displayed.

Figure 14B:
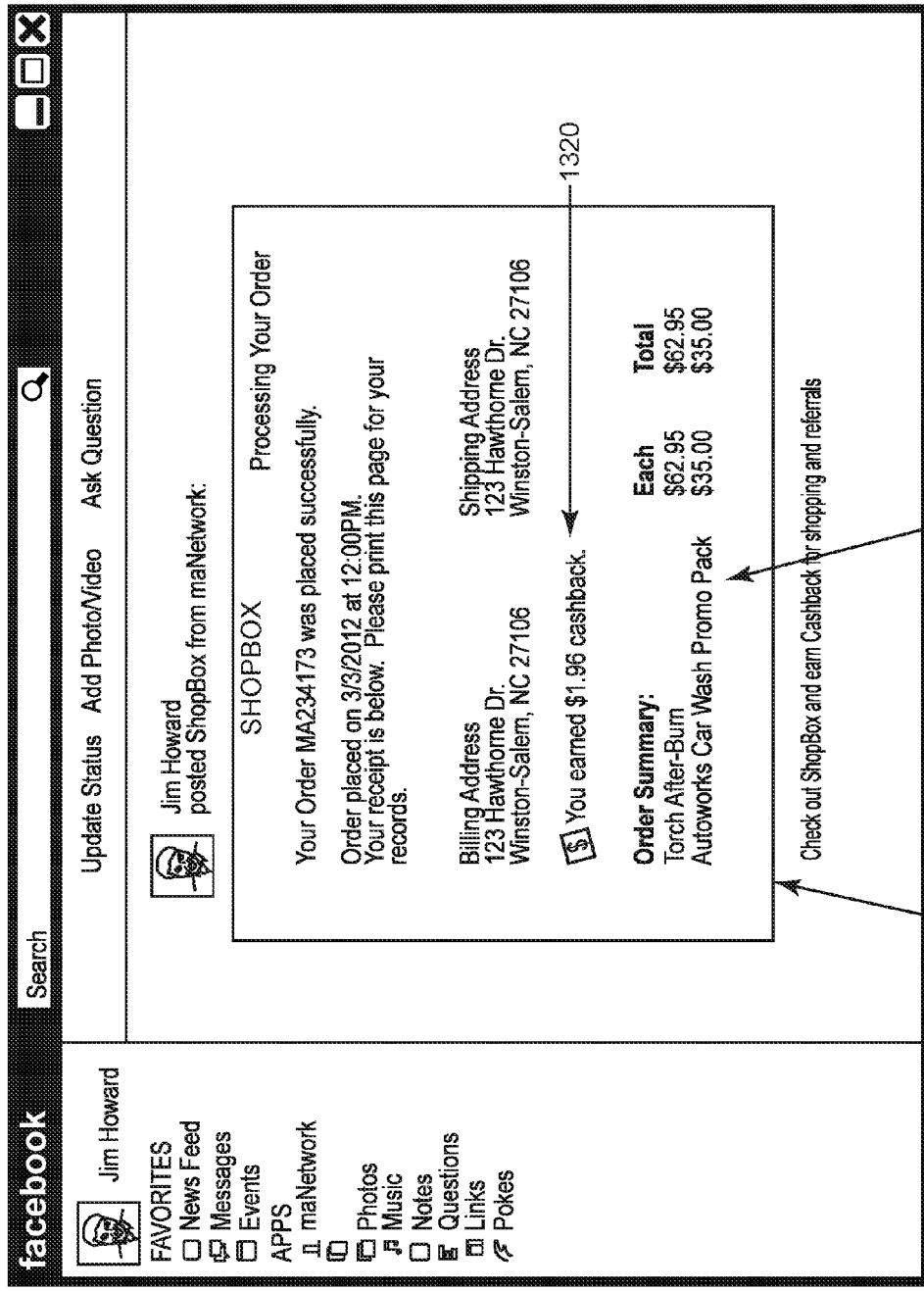
FIG. 14B is an exemplary user interface screen illustrating an order confirmation screen displayed in an embedded transaction module according to one embodiment of the present invention.

FIG. 14B is an exemplary user interface screen illustrating an order confirmation screen displayed in an ETM according to one embodiment of the present invention. In the illustrated embodiment, the order confirmation screen 1420 displayed by ETM 1401 provides an order number, the time and date of the transaction, the shipping and billing address information, and the products purchased. In other embodiments, the order confirmation screen may display the shipping method, estimated delivery date, payment method, total including tax and shipping costs, and/or buttons for printing the page or returning to the product display screens for additional shopping.

In one embodiment, the ETM of the present invention is used in conjunction with a rewards or cash back program. For example, a purchaser of products may earn a rewards or cash back amount with each purchase that may be applied to future purchases, redeemed for cash, or exchanged for other products, goods, services or special offers. In such an embodiment, a rewards or cash back value may be associated and displayed along with each product in the ETM. Examples are cash back values 725, 726 shown for each product displayed in FIG. 7 and cash back values 930, 931 shown for products in the shopping cart 903 of FIG. 9. In other embodiments rewards points or any other rewards tracking mechanism may be used. Furthermore, a total rewards amount associated with the purchase may be displayed by the embedded transaction model 610 at appropriate locations. For example, a rewards total 1320 is shown in FIGS. 13A, 13B, and 14B.

Figure 12A:
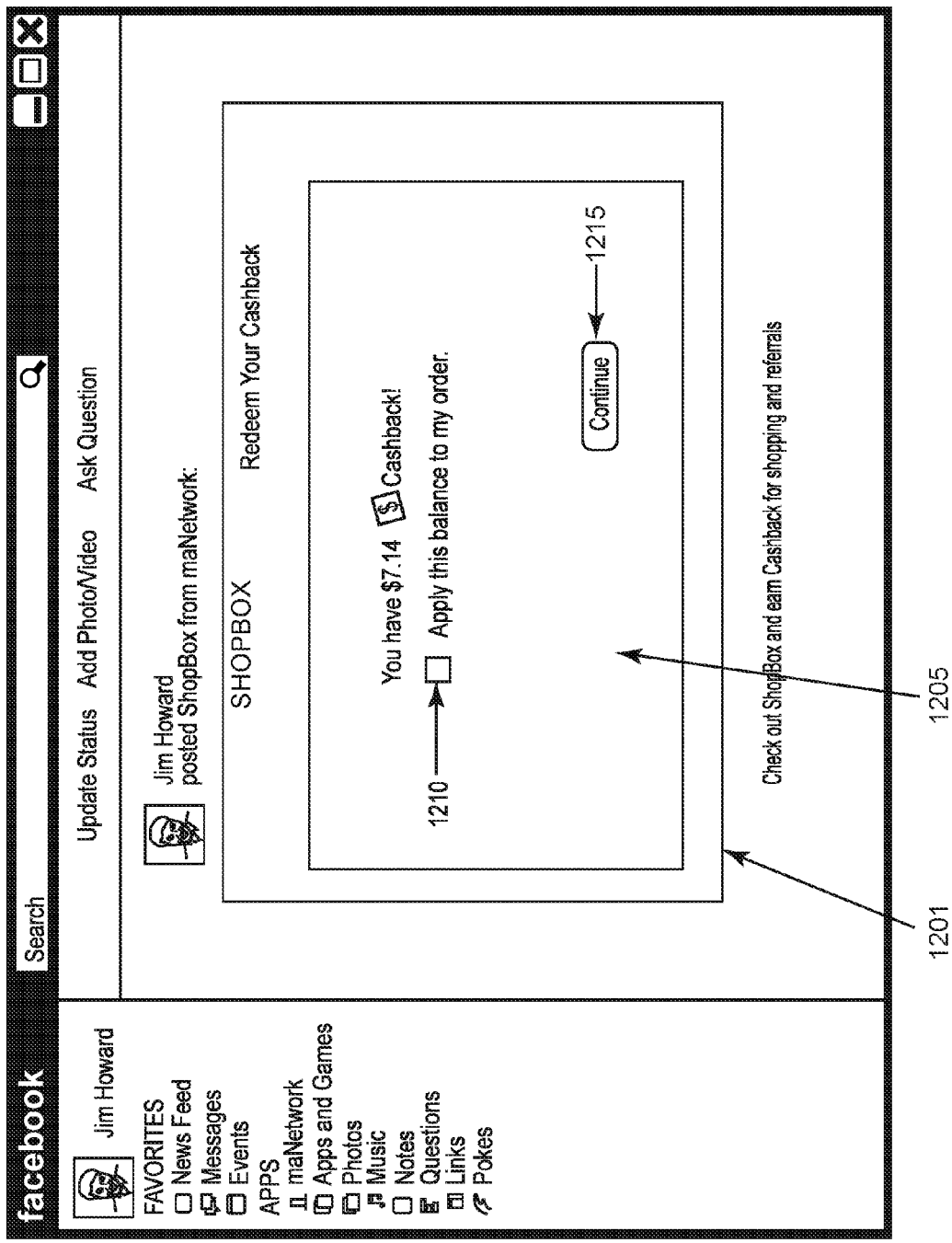
FIG. 12A is an exemplary user interface screen illustrating a rewards program interface of an embedded transaction module according to one embodiment of the present invention.

FIG. 12A is an exemplary user interface screen illustrating a rewards program interface of an ETM according to one embodiment of the present invention. In one embodiment, the ETM 1201 may provide rewards redemption interface 1205 for redeeming a cash back balance during the process of completing a transaction. In one embodiment, the ETM 1201 displays rewards redemption interface 1205 immediately after detecting that button 1115 of FIGS. 11A and 11B has been clicked (with form 1110 having been populated with all required information). In other embodiments, the functionality of rewards redemption interface 1205 may be displayed at a different point in the check out process or may implemented in the shopping cart 903 of FIG. 9 and/or the order review screen of FIGS. 13A, 13B, and 13C.

Reward redemption interface 1205 displays a cash back reward balance and provides a user clickable check box 1210 and a button 1215 (labeled "Continue"). The ETM 1201 detects whether check box 1210 is checked when button 1215 is pressed and stores the information for submission to the ETM Server 220 with the information for processing the transaction.

Figure 12B:
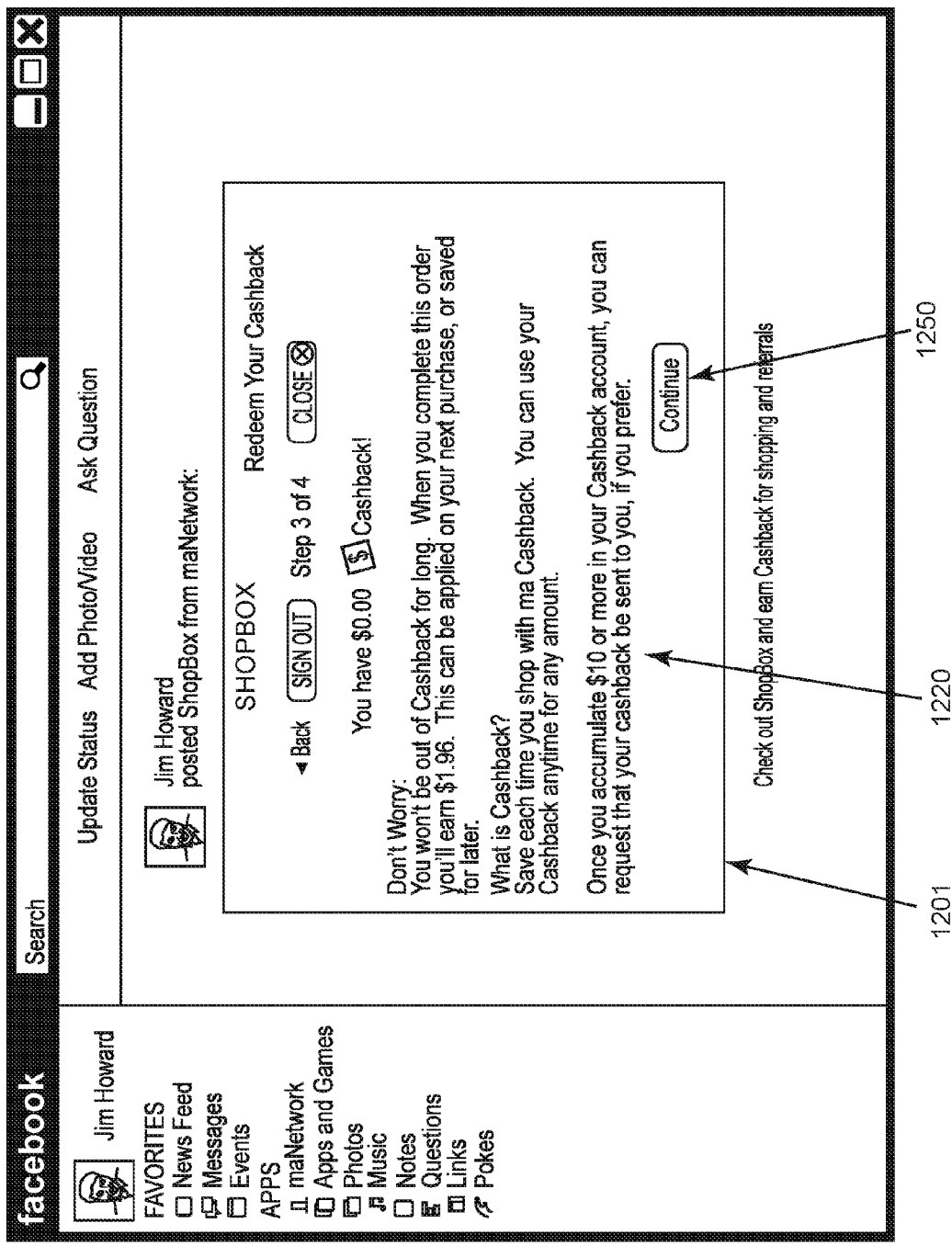
FIG. 12B is an exemplary user interface screen illustrating a rewards program interface of an embedded transaction module according to one embodiment of the present invention.

FIG. 12B is an exemplary user interface screen illustrating a rewards program interface of an ETM according to one embodiment of the present invention. In the event that a user does not have a cash back balance, the ETM 1201 may display the zero rewards balance screen 1220. As shown in FIG. 12B, the zero rewards balance screen 1220 notifies the user that they have a zero rewards balance and provides information about a rewards program. In another embodiment, the zero rewards balance screen 1220 provides a link to a webpage or to a downloadable document with information related to the rewards program. Upon detecting that button 1250 is clicked, the ETM 1201 displays the order review screen described in relation to FIGS. 13A, 13B, and 13C above.

In another embodiment, an ETM of the present invention may be used in conjunction with a rewards program in which a participant who posts an ETM on his/her personal page on a social media website, blog, or other site over which the user has some control, is rewarded for all transactions within the ETM. This of course provides a significant incentive for a user to post the ETM. In order to associate an ETM with a particular user, an ETM may include information uniquely identifying the user that creates or embeds the ETM in a webpage, such as a user's credentials.

In one embodiment, an ETM of the present invention is created and then provided to users to be embedded in webpages. The contents and appearance of the ETM are defined in advance of the user accessing the ETM. In another embodiment, the contents and the appearance of an ETM are customizable. In one embodiment, ETMs may be created and customized through a web-based tool accessed through a website.

FIGS. 15, 16, 17A and 17B are exemplary user interface screens illustrating a web-based tool according to one embodiment of the present invention. In particular, FIGS. 15, 16, 17A and 17B illustrate a web-based tool for creating and customizing ETMs. In the illustrated embodiment, the web-based tool is a subset of webpages of a set of Facebook application webpages for an organization. At the top of each webpage are links for easy navigation. For example, clicking link 1505 takes a user to the webpage illustrated by FIG. 15 and clicking link 1506 takes a user to the webpage illustrated by FIGS. 17A and 17B.

Figure 15:
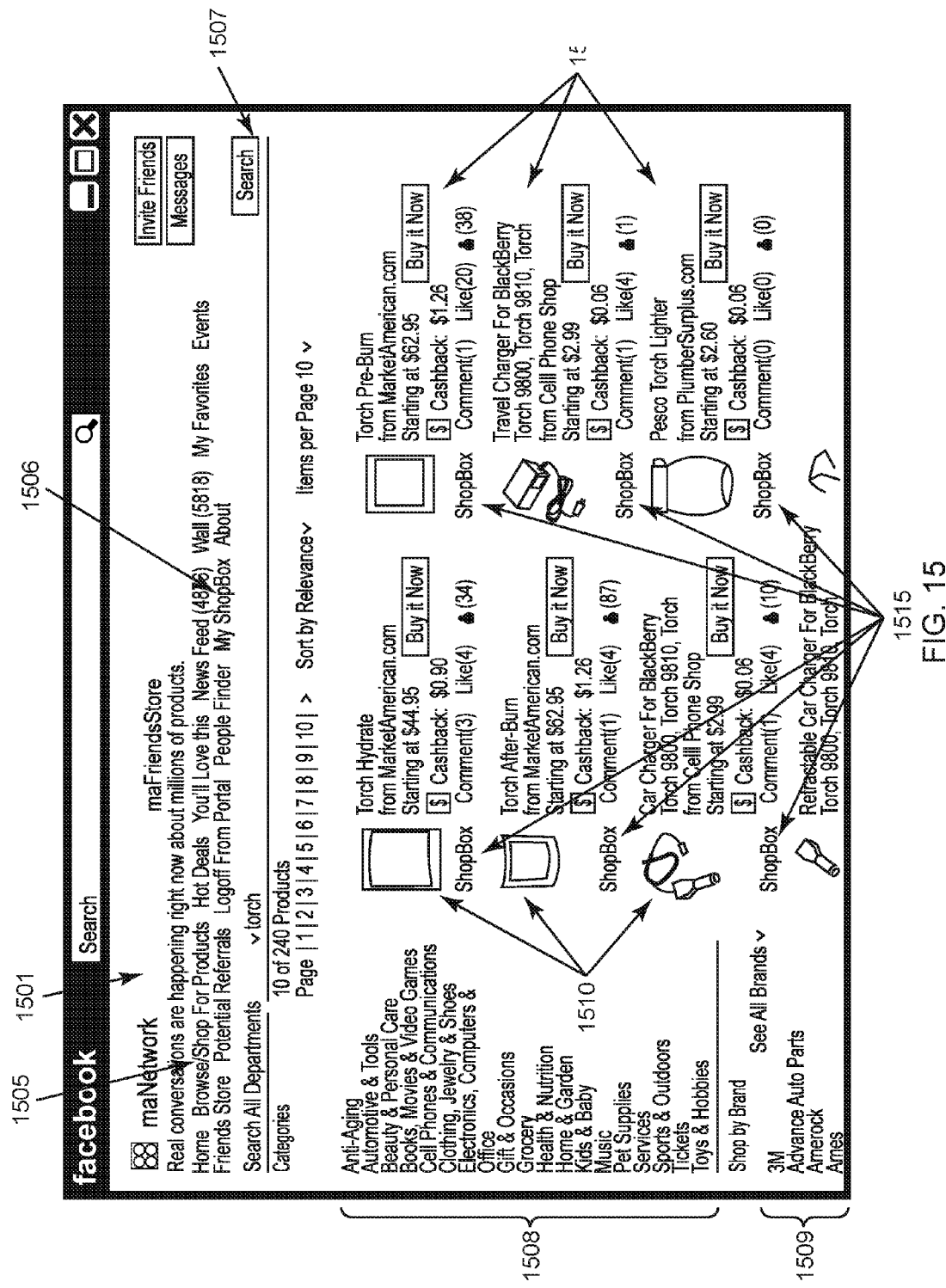
FIG. 15 is an exemplary user interface screen illustrating a web-based tool according to one embodiment of the present invention.
Figure 16:
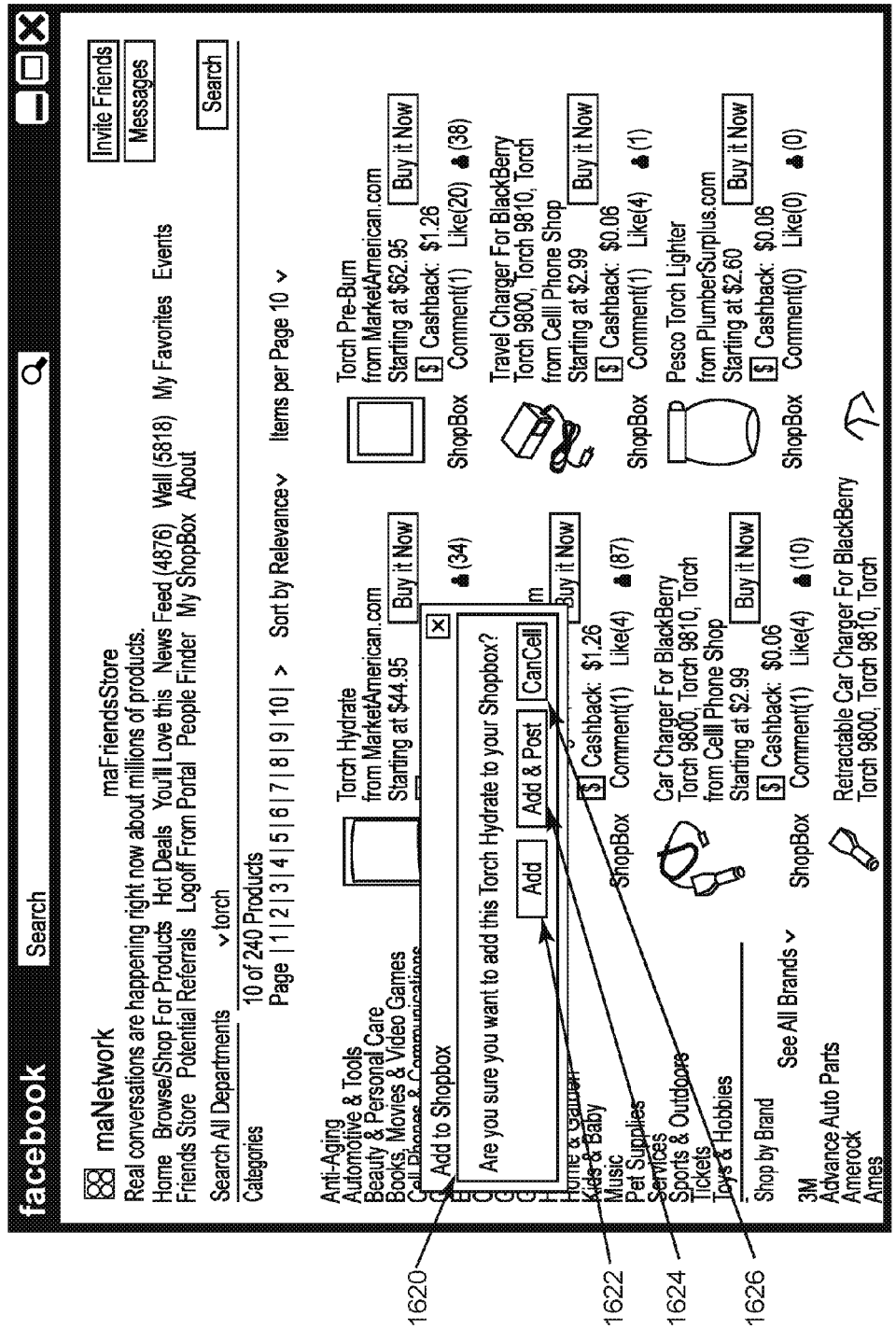
FIG. 16 is an exemplary user interface screen illustrating a web-based tool according to one embodiment of the present invention.

FIG. 15 illustrates a product browsing webpage 1501 according to an embodiment of the present invention. Product browsing webpage 1501 comprises products 1510, search tool 1507, product category links 1508, and brand links 1509. Each displayed product 1510 has an associated link for selecting the product to be displayed in a user's ETM. Clicking a link 1515 causes the product browsing webpage 1501 to display a confirmation box 1620, illustrated in FIG. 16. Confirmation box 1620 comprises three buttons 1622, 1624 and 1626 for respectively adding the product to a list of products to be displayed in the ETM, adding the product and posting the ETM to the user's Facebook wall, and cancelling the addition of the product to the list of products to be displayed in the ETM.

Figure 17A:
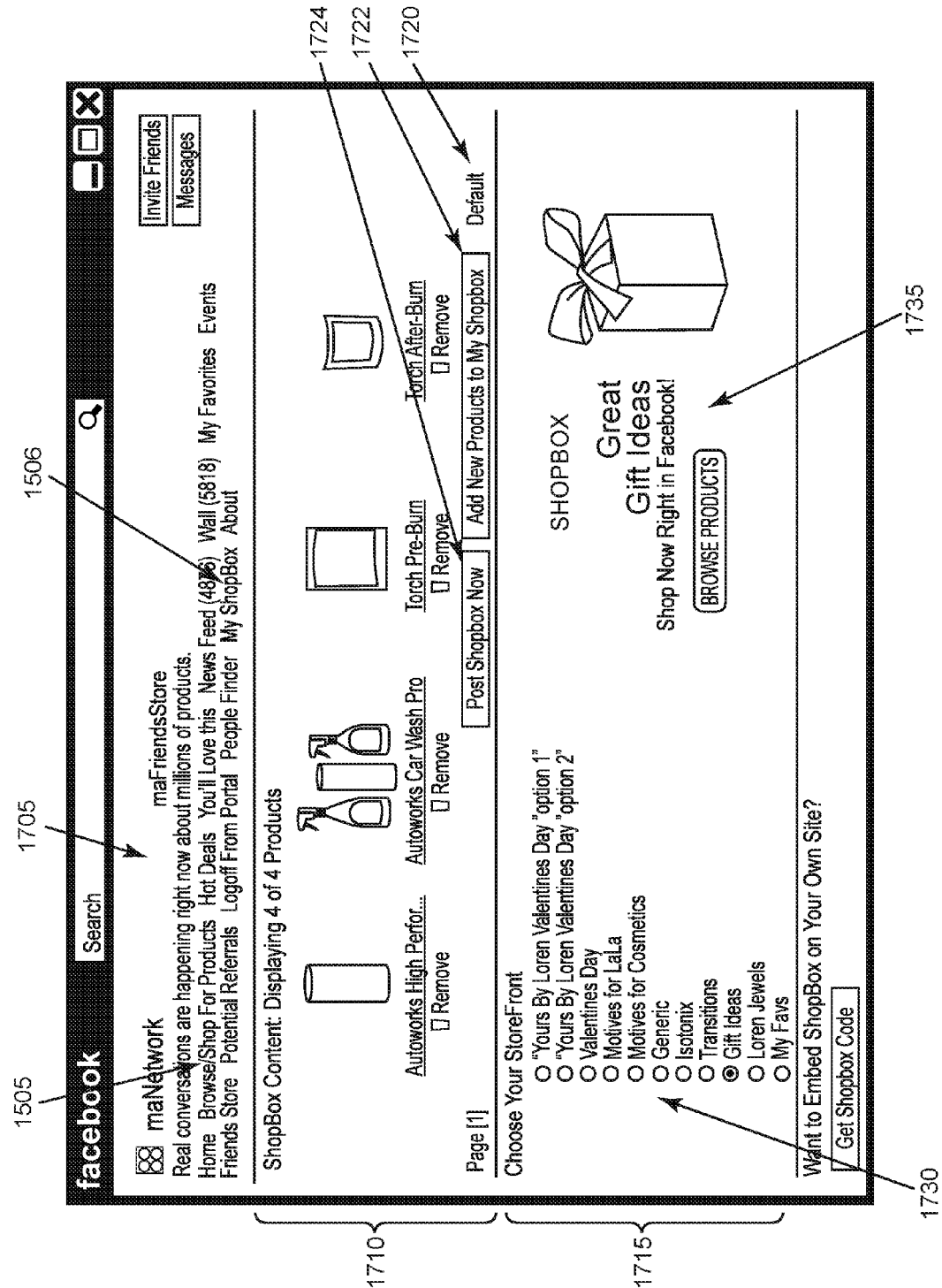
FIG. 17A is an exemplary user interface screen illustrating a web-based tool according to one embodiment of the present invention.
Figure 17B:
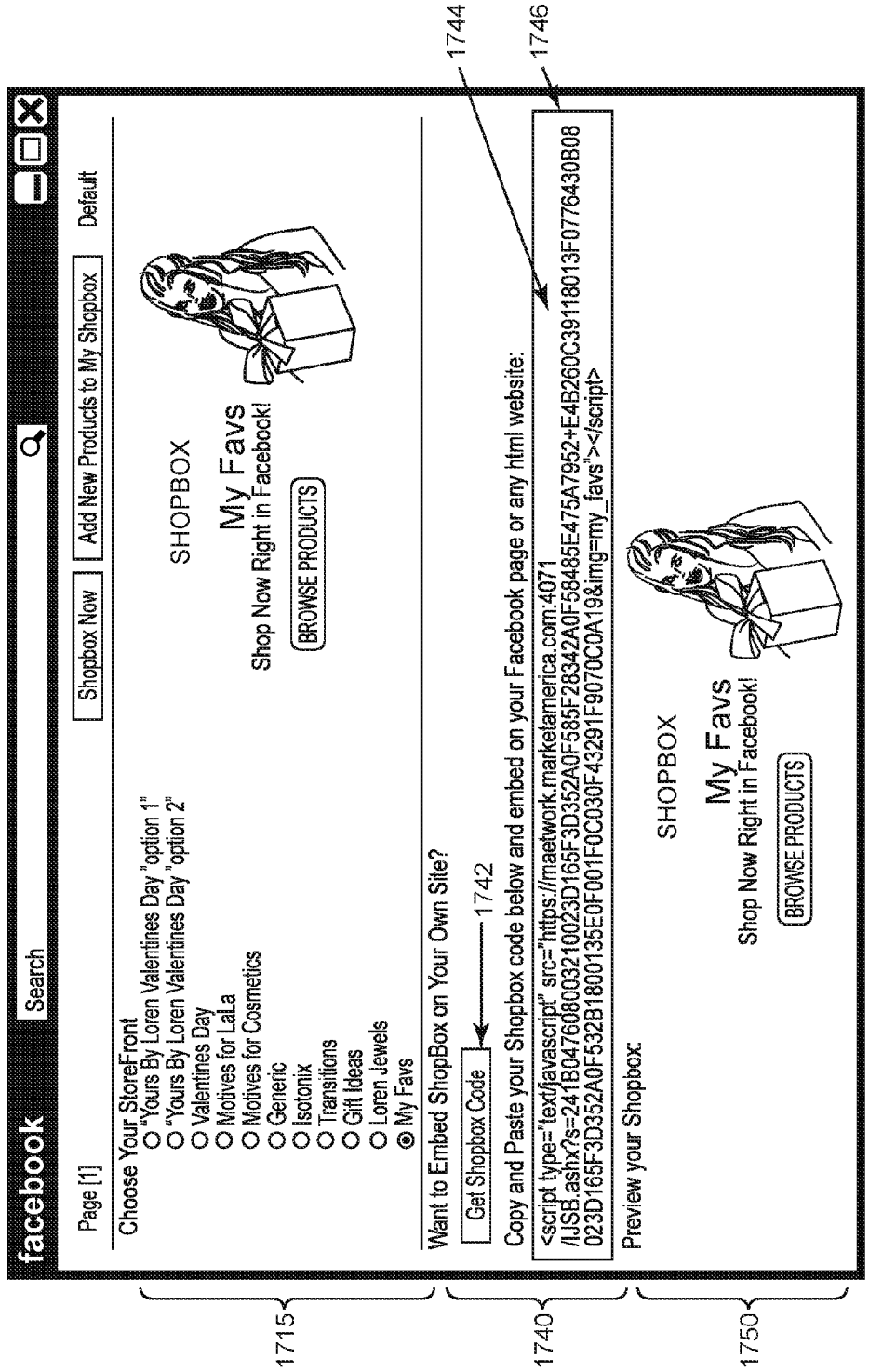
FIG. 17B is an exemplary user interface screen illustrating a web-based tool according to one embodiment of the present invention.

FIGS. 17A and 17B illustrate an ETM configuration webpage 1705. ETM configuration webpage 1705 comprises a product list area 1710 for displaying the products a user has selected for display in an ETM. A user may select an existing ETM to customize or may create a new ETM to customize using drop-down selection list 1720. Clicking button 1722 takes the user to product browsing webpage 1501. Clicking button 1724 posts the ETM that is currently selected based according to drop-down selection list 1720 to the user's Facebook wall. Clicking on a product image or title of a product displayed in product list area 1710 takes the user to a product detail webpage for that product. Clicking the image of a trash can or the text "Remove" below one of the products displayed in product list area 1710 removes the product from the list of products that are displayed by the currently selected ETM.

ETM configuration webpage 1705 further comprises image selection area 1715 for selecting an initial image to be displayed by the ETM as described above in relation to FIG. 6. Image selection area 1715 comprises a set of radio buttons 1730 for making a selection and an image preview area 1735 that displays the image selected using radio buttons 1730. In another embodiment, a user may upload an initial image to be displayed by an ETM.

ETM configuration webpage 1705 further comprises ETM code generation area 1740 illustrated in FIG. 17B. Clicking button 1742 causes a code 1744 to be generated in field 1746. For example, an HTML code may be generated. A user may then copy the code 1744 to an appropriate location to embed the associated ETM in a webpage. Finally, ETM configuration webpage 1705 further comprises a preview area 1750 that contains a functional instance of the configured ETM with which the user may interact. In this way, a user may easily make iterative adjustments and view the result of the adjustments to the ETM with out leaving ETM configuration webpage 1705.

As described above, in some embodiments the web-based tool for creating and customizing ETMs may be accessed through a website comprising webpages on which a created ETM will be located. In other embodiments the web-based tool may be accessed through a website other than a website comprising webpages on which the created ETMs will be located.

In addition to the customization aspects described above, a web-based tool for creating and customizing ETMs may allow for customization of many other aspects of an ETM. For example, in another embodiment, a user may select a skin, template or theme for an ETM. In yet another embodiment, the functionality and behavior of an ETM may dynamically change based on the product being displayed, and such behavioral changes may be controlled by the user that is creating the ETM.

In some embodiments, the ETMs or the back-end servers and databases (e.g. server 220 and database 240 of FIG. 2) supporting the ETM are configured to track information and provide statistics regarding the display, accesses, and sales of a an ETM. Information and statistics for each ETM may be collected, for example, to ensure that a creator of an ETM receives appropriate credits or rewards. In one embodiment, information and statistics for an ETM may displayed on a separate webpage, called a dashboard. For example, the administrator of a rewards or cash back program may provide dashboard webpages for one or more ETMs associated with the program. Dashboard webpages may be located on the website on which the ETM is embedded, or may be located on separate website.

Figure 18A:
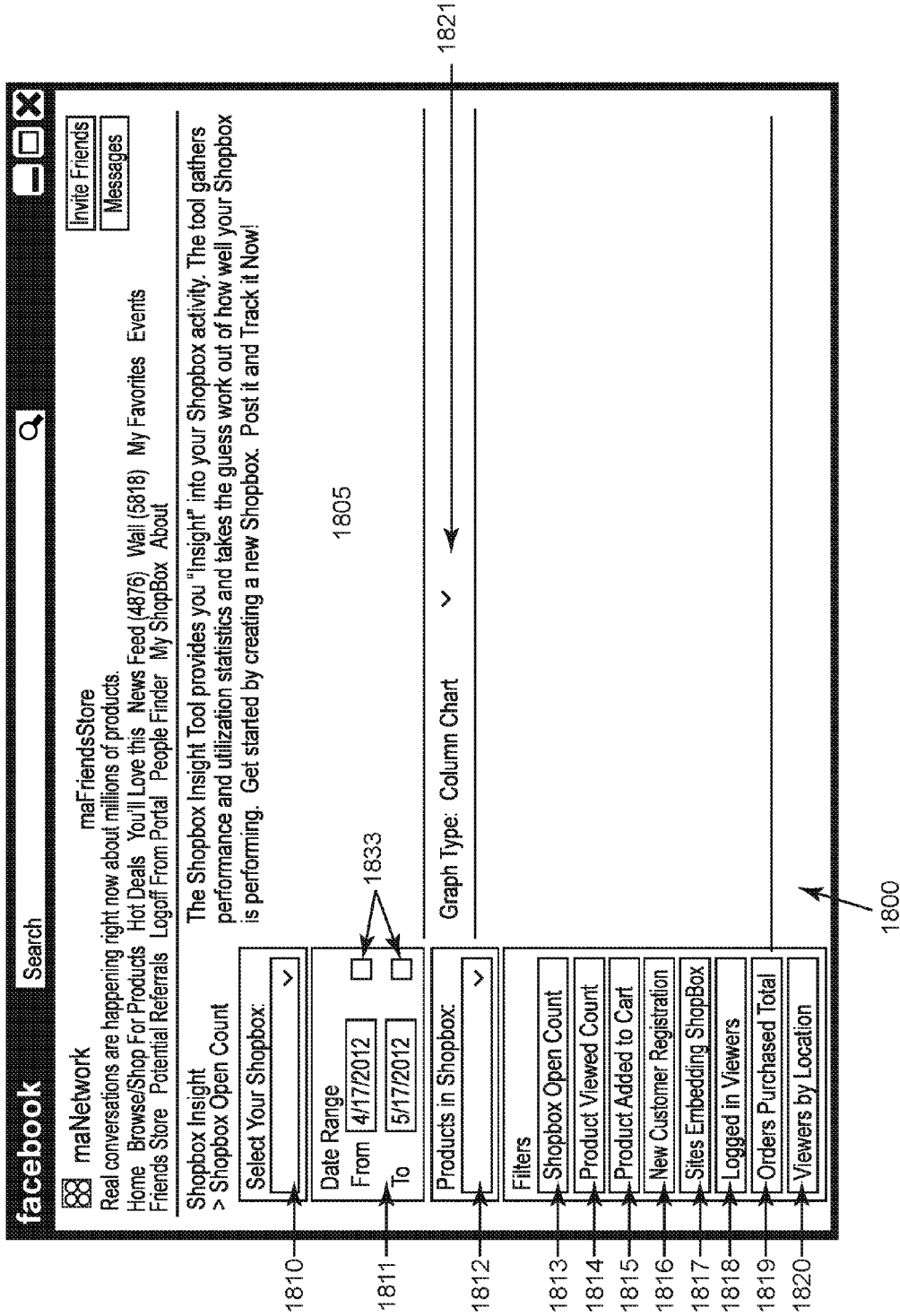
FIG. 18A is an exemplary user interface screen illustrating a web-based tool according to one embodiment of the present invention.
Figure 18B:
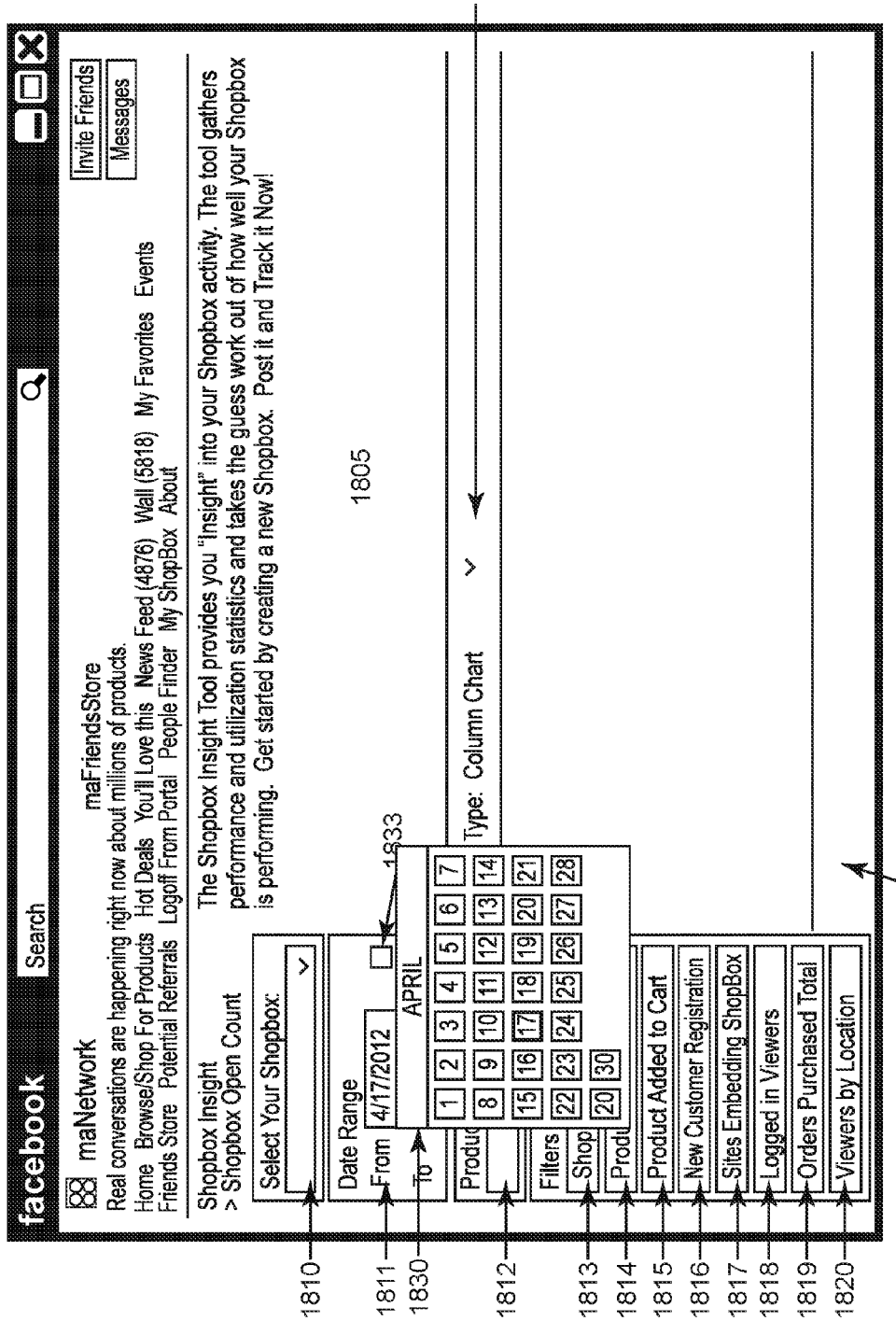
FIG. 18B is an exemplary user interface screen illustrating a web-based tool according to one embodiment of the present invention.

FIGS. 18A and 18B illustrate an exemplary dashboard interface according to one embodiment of the present invention. The dashboard webpage 1800 comprises drop down selection box 1810 for selecting a particular ETM, display area 1805, date range interface 1811 for viewing and modifying the date range limiting the display of statistical data to a particular period, drop down selection box 1812 for selecting a specific product of an ETM, drop down selection box 1821 for selecting different graphical representations for the display of statistical data, and filter buttons 1813-1820 for selecting types of statistical information to be displayed. In response to selecting a particular ETM using selection box 1810, statistics and other data for that ETM, or a graphical representation thereof, are displayed in display area 1805. Drop down selection box 1821 allows a user to select different graphical representations for the display of the statistical data in display area 1805. For example, bar chart, pie chart, and column chart options may be provided. The "From" and "To" fields of date range interface 1811 display a current date range limiting the scope of the displayed data and are editable to allow a user to modify the date range. Alternatively, a user may click on calendar icons 1833 to display a calendar 1830 (displayed in FIG. 18B) for selecting desired dates. The data displayed or graphically represented in display area 1805 is updated in response to modifications to the date range. Finally, filter buttons 1813-1820 are provided to allow selection of particular types of data, or representations thereof, to be displayed in display area 1805, including selection of data related to ETM accesses, product views, shopping cart activity, new customer registrations, sites containing the ETM, viewers, orders, and any other data related to ETM usage.

Furthermore, the ETM of the present invention may be used for a number of types of transactions beyond selling/purchasing physical products. In one embodiment of the present invention, for example, an ETM may be used to display and sell digital products. For example, an ETM may display a list of songs, movies, or software applications for sale. The ETM may provide the ability to preview the digital products listed for sale. For example, the ETM may be operative to play a portion of a song or video for sale and may display video footage of a software application in use. In one embodiment, the ETM may provide a link for downloading a digital product after it has been purchased. In another embodiment, the ETM may display a license agreement governing the purchase of a digital product.

In another exemplary embodiment, an ETM could be used to provide a travel shop that sells all manner of travel-related products including flight, bus, train, cruise, hotel, lodging, vehicle, tour or excursion reservations, and travel packages comprising two or more of the foregoing. In another embodiment, a travel shop may display special travel deals and limited time offers. The travel products for sale may be organized or grouped based on any of a number of criteria or methods, and the travel shop may be implemented using any number of user interface design variations.

Other types of transactions for which and ETM may be used include placing reservations (e.g. restaurant reservations), purchasing advertisements, participating in auctions, ordering food deliveries, or any other type of transaction that may typically be handled by an e-commerce website.

In yet another exemplary embodiment, ETM functionality may be used in conjunction with social media websites, or similar websites, to rapidly display and sell sale and/or limited availability products. For example, Facebook allows pages for organizations or entities, such as retailers, to which Facebook users can subscribe or join and give permission for that page to post on users' walls. When an organization has a sale or limited availability item it wishes to advertise and sell, an agent of the organization may create an ETM listing the sale or limited availability product and embed the ETM on the organization's Facebook page and on the personal Facebook pages of every Facebook user that has joined or subscribed to the organization's Facebook page. For limited availability items, the organization may further customize the ETM to display the remaining available quantity for the advertised item. As described herein, viewers of the ETMs may complete a purchase of the sale or limited availability item within the ETM without navigating away from the webpage on which they first viewed the ETM.

The foregoing examples are provided for illustrative purposes only. The present invention is not limited to these exemplary embodiments.

GENERAL

While the methods and systems herein are described in terms of software executing on various machines, the methods and systems may also be implemented as specifically-configured hardware, such as a field-programmable gate array (FPGA) specifically to execute the various methods. For example, embodiments can be implemented in digital electronic circuitry, or in computer hardware, firmware, software, or in a combination of thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

We claim:

1. A method comprising:
   receiving, by a processor, a code segment for an embedded transaction module, wherein the code segment is selected from a plurality of code segments based at least in part on a type or a capability of a client device;
   outputting, by the processor, the embedded transaction module in a first webpage;
   receiving, by the processor, a user input in the embedded transaction module,
   wherein the user input is associated with a transaction and the embedded transaction module is not affiliated with the first webpage; and
   completing, by the processor, the transaction within the first webpage;
   wherein at least two of the plurality of code segments are in different programming languages, and wherein the code segment comprises a jQuery-based interface.

2. The method of claim 1, further comprising displaying at least one product in the embedded transaction module.

3. The method of claim 2, wherein the at least one product comprises media.

4. The method of claim 1, wherein completing the transaction comprises displaying a shopping cart.

5. The method of claim 1, further comprising:
   receiving a customization parameter; and
   customizing the embedded transaction module based at least in part on the customization parameter.

6. The method of claim 1, wherein at least two of the plurality of code segments are in different programming languages, and wherein the code segment comprises a Flash-based interface.

7. The method of claim 1, further comprising capturing statistical data associated with said transaction.

8. The method of claim 1, wherein the first webpage is a social media webpage.

9. A non-transitory computer readable medium comprising software program code including logic, which when executed by a processor, is operable to perform the following steps:
   receive a code segment for an embedded transaction module, wherein the code segment is selected from a plurality of code segments based at least in part on a type or a capability of a client device;
   output the embedded transaction module in a first webpage;
   receive a user input in the embedded transaction module displayed in the first webpage, wherein the user input is associated with a transaction and the embedded transaction module is not affiliated with the first webpage; and
   complete the transaction within the first webpage;
   wherein at least two of the plurality of code segments are in different programming languages, and wherein the code segment comprises a jQuery-based interface.

10. The non-transitory computer readable medium of claim 9, the logic further operable to display at least one product in the embedded transaction module.

11. The non-transitory computer readable medium of claim 10, wherein the at least one product comprises media.

12. The non-transitory computer readable medium of claim 9, the logic further operable to display a shopping cart.

13. The non-transitory computer readable medium of claim 9, the logic further operable to:
receive a customization parameter; and
customize the embedded transaction module based at least in part on the customization parameter.

14. The non-transitory computer readable medium of claim 9, wherein at least two of the plurality of code segments are in different programming languages, and wherein the code segment comprises a Flash-based interface.

15. The non-transitory computer readable medium of claim 9, the logic further operable to capture statistical data associated with said transaction.

16. The non-transitory computer readable medium of claim 9, wherein the first webpage is a social media webpage.

17. A transaction system comprising:
a processor; and
a memory in communication with the processor, the memory comprising computer program code executable by the processor to:
receive a code segment for an embedded transaction module, wherein the code segment is selected from a plurality of code segments based at least in part on a type or a capability of a client device;
output the embedded transaction module in a first webpage;
receive a user input in the embedded transaction module displayed in the first webpage, wherein the user input is associated with a transaction and the embedded transaction module is not affiliated with the first webpage; and
complete the transaction within the first webpage;
wherein at least two of the plurality of code segments are in different programming languages, and wherein the code segment comprises a jQuery-based interface.

18. The transaction system of claim 17, the memory further comprising software program code executable by the processor to display at least one product in the embedded transaction module.

19. The transaction system of claim 18, wherein the at least one product comprises media.

20. The transaction system of claim 17, the memory further comprising software program code executable by the processor to display a shopping cart.

21. The transaction system of claim 17, the memory further comprising software program code executable by the processor to:
receive a customization parameter; and
customize the embedded transaction module based at least in part on the customization parameter.

22. The transaction system of claim 17, wherein at least two of the plurality of code segments are in different programming languages, and wherein the code segment comprises a Flash-based interface.

23. The transaction system of claim 17, the memory further comprising software program code executable by the processor to capture statistical data associated with said transaction.

24. The transaction system of claim 17, wherein the first webpage is a social media webpage.

25. The method of claim 1, further comprising:
transmitting a File Transfer Protocol request to a server; and
receiving, from the server and based on the File Transfer Protocol request, the code segment.

26. The method of claim 2, further comprising:
outputting an image comprising a zoomed-in version, a zoomed-out version, or an alternative view of the at least one product within the embedded transaction module responsive to a user clicking on an icon within the embedded transaction module.

27. The method of claim 1, wherein completing the transaction within the first webpage comprises:
displaying an order processing interface for a period of time until a response is received from a server; and
upon receiving the response from the server, displaying an order confirmation screen.

28. The method of claim 5, wherein the customization parameter comprises an initial image to be displayed by the embedded transaction module.

29. The method of claim 2, wherein displaying at least one product in the embedded transaction module comprises displaying a quantity of the at least one product that is still available for purchase.

30. The method of claim 2, wherein the transaction comprises purchasing a flight reservation, a bus reservation, a train reservation, a cruise reservation, a hotel reservation, a lodging reservation, a vehicle reservation, a tour reservation, an excursion reservation, an advertisement, or a food item.

31. The method of claim 8, wherein the social media webpage comprises a Facebook news feed.

* * * * *